United States Patent
Kranski et al.

(10) Patent No.: US 11,478,927 B1
(45) Date of Patent: Oct. 25, 2022

(54) HYBRID COMPUTING ARCHITECTURES WITH SPECIALIZED PROCESSORS TO ENCODE/DECODE LATENT REPRESENTATIONS FOR CONTROLLING DYNAMIC MECHANICAL SYSTEMS

(71) Applicant: Giant.AI, Inc., Campbell, CA (US)

(72) Inventors: Jeff Kranski, Campbell, CA (US); Chris Cianci, Campbell, CA (US); Carolyn Wales, Campbell, CA (US); Adrian Kaehler, Campbell, CA (US)

(73) Assignee: Giant.AI, Inc., Campbell, CA (US)

( * ) Notice: Subject to any disclaimer, the term of this patent is extended or adjusted under 35 U.S.C. 154(b) by 0 days.

(21) Appl. No.: 17/711,960

(22) Filed: Apr. 1, 2022

Related U.S. Application Data

(60) Provisional application No. 63/169,724, filed on Apr. 1, 2021.

(51) Int. Cl.
*B25J 9/16* (2006.01)
*B25J 13/08* (2006.01)

(52) U.S. Cl.
CPC .............. *B25J 9/163* (2013.01); *B25J 9/161* (2013.01); *B25J 13/086* (2013.01)

(58) Field of Classification Search
CPC ........... B25J 9/163; B25J 9/161; B25J 13/086
USPC ................................................. 700/245–264
See application file for complete search history.

(56) References Cited

U.S. PATENT DOCUMENTS

| | | | | |
|---|---|---|---|---|
| 5,963,447 A | * | 10/1999 | Kohn ............... | G05B 19/41865 706/50 |
| 6,088,689 A | * | 7/2000 | Kohn ................. | G05B 19/4148 706/46 |
| 6,262,678 B1 | * | 7/2001 | Sarpeshkar ........... | H03M 1/164 341/110 |
| 8,874,477 B2 | * | 10/2014 | Hoffberg ................ | G06Q 20/40 705/37 |
| 9,015,093 B1 | * | 4/2015 | Commons ............. | B60W 30/00 706/26 |

(Continued)

FOREIGN PATENT DOCUMENTS

EP  3770820 A1  1/2021

OTHER PUBLICATIONS

Coppola, M. et al, Design of Cost-Efficient Interconnect Processing Units: Spidergon STNoC (1st ed.). 2009, CRC Press, https://doi.org/10.1201/9781315219936, pp. 1-288 (Year: 2009).*

(Continued)

*Primary Examiner* — Jaime Figueroa
(74) *Attorney, Agent, or Firm* — Pillsbury Winthrop Shaw Pittman, LLP

(57) ABSTRACT

Provided is a robot that includes: a first sensor having a first output and configured to sense state of a robot or an environment of the robot; a first hardware machine-learning accelerator coupled to the first output of the first sensor and configured to transform information sensed by the first sensor into a first latent-space representation; a second sensor having a second output and configured to sense state of the robot or the environment of the robot; a second hardware machine-learning accelerator configured to transform information sensed by the second sensor into a second latent-space representation; and a processor configured to control the robot based on both the first latent-space representation and the second latent-space representation.

20 Claims, 6 Drawing Sheets

(56) References Cited

U.S. PATENT DOCUMENTS

| | | | |
|---|---|---|---|
| 9,346,167 B2* | 5/2016 | O'Connor | G06N 3/008 |
| 9,495,537 B2* | 11/2016 | Gupta | G06F 21/316 |
| 9,691,034 B2* | 6/2017 | Lee | G06N 20/00 |
| 9,875,440 B1* | 1/2018 | Commons | G01C 21/3602 |
| 10,025,813 B1* | 7/2018 | Gebremariam | G06F 7/02 |
| 10,237,420 B1* | 3/2019 | Wu | H04M 3/42068 |
| 10,332,320 B2* | 6/2019 | Lakshamanan | B60W 50/0098 |
| 10,718,031 B1* | 7/2020 | Wu | G01N 33/57484 |
| 10,769,526 B2* | 9/2020 | Daga | G06N 3/0454 |
| 10,817,530 B2* | 10/2020 | Siebel | H04L 67/12 |
| 10,986,270 B2* | 4/2021 | Smith | H04N 5/23245 |
| 11,100,643 B2* | 8/2021 | Yang | G06N 3/0445 |
| 11,170,294 B2* | 11/2021 | Bruestle | G06F 7/76 |
| 2007/0087756 A1* | 4/2007 | Hoffberg | G06Q 20/065 455/450 |
| 2014/0324747 A1* | 10/2014 | Crowder | G06N 3/0436 706/18 |
| 2017/0006135 A1* | 1/2017 | Siebel | G06N 20/00 |
| 2017/0200094 A1* | 7/2017 | Bruestle | G06F 5/01 |
| 2018/0191867 A1* | 7/2018 | Siebel | H04L 69/40 |
| 2018/0260706 A1 | 9/2018 | Galloway et al. | |
| 2018/0300964 A1* | 10/2018 | Lakshamanan | G06N 3/0445 |
| 2018/0307303 A1* | 10/2018 | Powderly | G06T 19/003 |
| 2019/0220471 A1* | 7/2019 | Mota Toledo | G06N 7/005 |
| 2019/0325303 A1* | 10/2019 | Daga | G06N 3/063 |
| 2019/0382007 A1* | 12/2019 | Casas | G06N 20/00 |
| 2019/0387168 A1* | 12/2019 | Smith | H04N 5/23245 |
| 2020/0061811 A1* | 2/2020 | Iqbal | B25J 9/1612 |
| 2020/0065682 A1* | 2/2020 | Paulina | G09B 19/00 |
| 2020/0293828 A1* | 9/2020 | Wang | G06T 7/11 |
| 2020/0305765 A1* | 10/2020 | Herr | A61B 5/1107 |
| 2020/0337625 A1* | 10/2020 | Aimone | A61B 5/7275 |
| 2020/0342337 A1* | 10/2020 | Choudhary | H04L 61/103 |
| 2020/0356835 A1 | 11/2020 | Robinson et al. | |
| 2020/0361083 A1* | 11/2020 | Mousavian | B25J 9/1697 |
| 2020/0364508 A1* | 11/2020 | Gurel | G06V 20/41 |
| 2020/0370423 A1 | 11/2020 | Li et al. | |
| 2020/0379454 A1 | 12/2020 | Trinh et al. | |
| 2020/0380369 A1* | 12/2020 | Case | G06N 3/063 |
| 2021/0063578 A1* | 3/2021 | Wekel | G06K 9/6271 |
| 2021/0064987 A1* | 3/2021 | Springer | G06F 17/153 |
| 2021/0073612 A1* | 3/2021 | Vahdat | G06N 3/082 |
| 2021/0073995 A1* | 3/2021 | Yang | G06T 5/002 |
| 2021/0081752 A1 | 3/2021 | Chao et al. | |
| 2021/0252698 A1 | 8/2021 | Paxton et al. | |
| 2021/0253128 A1 | 8/2021 | Nister et al. | |
| 2021/0326189 A1* | 10/2021 | Shah | G06N 3/063 |
| 2021/0357782 A1 | 11/2021 | Graves et al. | |
| 2021/0374518 A1* | 12/2021 | Zhu | G06K 9/6256 |
| 2021/0387330 A1 | 12/2021 | Mavrin et al. | |
| 2022/0016766 A1 | 1/2022 | Humayun et al. | |
| 2022/0035973 A1 | 2/2022 | Liebman et al. | |
| 2022/0051138 A1 | 2/2022 | Stoll et al. | |
| 2022/0067522 A1* | 3/2022 | Bruestle | G06F 5/01 |
| 2022/0084272 A1 | 3/2022 | Wang et al. | |
| 2022/0101627 A1 | 3/2022 | Pappas et al. | |

OTHER PUBLICATIONS

Internet Archive of "Transfer Learning," Wikipedia, https://web.archive.org/web/20210331015532/https://en.wikipedia.org/wiki/Transfer_learning, Mar. 31, 2021, pp. 1-5.

International Search Report and Written Opinion in related international application PCT/US2022/023164, pp. 1-10.

* cited by examiner

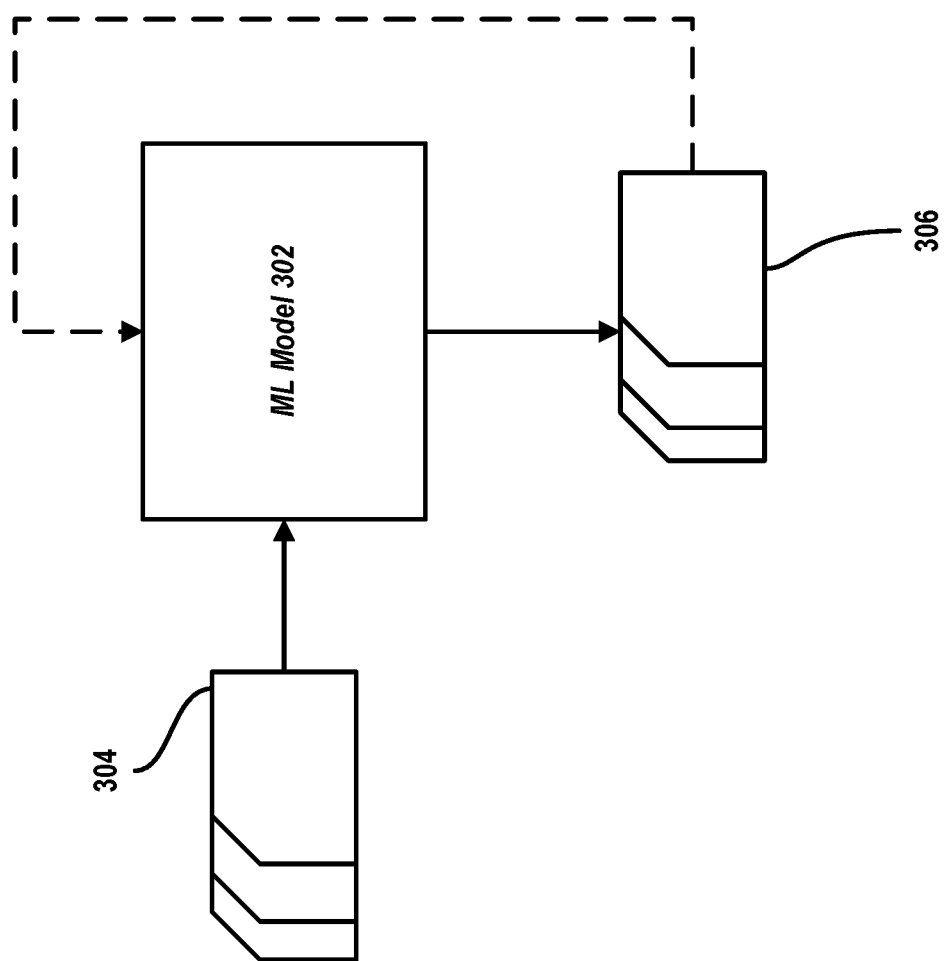

HYBRID COMPUTING ARCHITECTURES WITH SPECIALIZED PROCESSORS TO ENCODE/DECODE LATENT REPRESENTATIONS FOR CONTROLLING DYNAMIC MECHANICAL SYSTEMS

CROSS-REFERENCE TO RELATED APPLICATIONS

The present application claims the benefit of U.S. Provisional Appl. 63/169,724, filed 1 Apr. 2021. The contents of each aforementioned filing are incorporated herein by reference in their entirety.

BACKGROUND

1. Field

The present disclosure relates generally to artificial intelligence and, more specifically, to hybrid computing architectures using specialized processors to handle encoding or decoding of latent representations used to control dynamic mechanical systems.

2. Description of the Related Art

Dynamic mechanical systems are often controlled with computational processes. Examples include robots, industrial processes, life support systems, and medical devices. Generally, such a process takes input from sensors indicative of state of the dynamic mechanical system and its environment and determines outputs that serve to control various types of actuators within the dynamic mechanical system, thereby changing the state of the system and potentially its environment. In recent years, computational processes for controlling dynamic mechanical systems have been improved using machine learning.

Various disciplines of machine learning, like computer vision, have been used to implement dynamic mechanical systems. Often, a model is trained in advance of deployment, and then that model is used at runtime for purposes like inference to determine how to control the dynamic mechanical system. In many cases, various sensors provide inputs to the model upon which outputs are based. Often, the model is executed in memory of a computing device (such as an embedded or remote device) that both uses the model to infer state of the dynamic mechanical system relative to a target state and determines how to control the dynamic mechanical system responsive to differences therebetween.

SUMMARY

The following is a non-exhaustive listing of some aspects of the present techniques. These and other aspects are described in the following disclosure.

Some aspects include a robot that includes: a first sensor having a first output and configured to sense state of a robot or an environment of the robot; a first hardware machine-learning accelerator coupled to the first output of the first sensor, the first hardware machine-learning accelerator being configured to transform information sensed by the first sensor and conveyed via the first output into a first latent-space representation that is of a lower dimensionality than information sensed by the first sensor; a second sensor having a second output and configured to sense state of the robot or the environment of the robot; a second hardware machine-learning accelerator coupled to the second output of the second sensor, the second hardware machine-learning accelerator being configured to transform information sensed by the second sensor and conveyed via the second output into a second latent-space representation that is of a lower dimensionality than information sensed by the second sensor; and a processor configured to control the robot based on both the first latent-space representation and the second latent-space representation.

BRIEF DESCRIPTION OF THE DRAWINGS

The above-mentioned aspects and other aspects of the present techniques will be better understood when the present application is read in view of the following figures in which like numbers indicate similar or identical elements:

FIG. 3 is an example machine learning model, in accordance with some embodiments;

Figure 1:
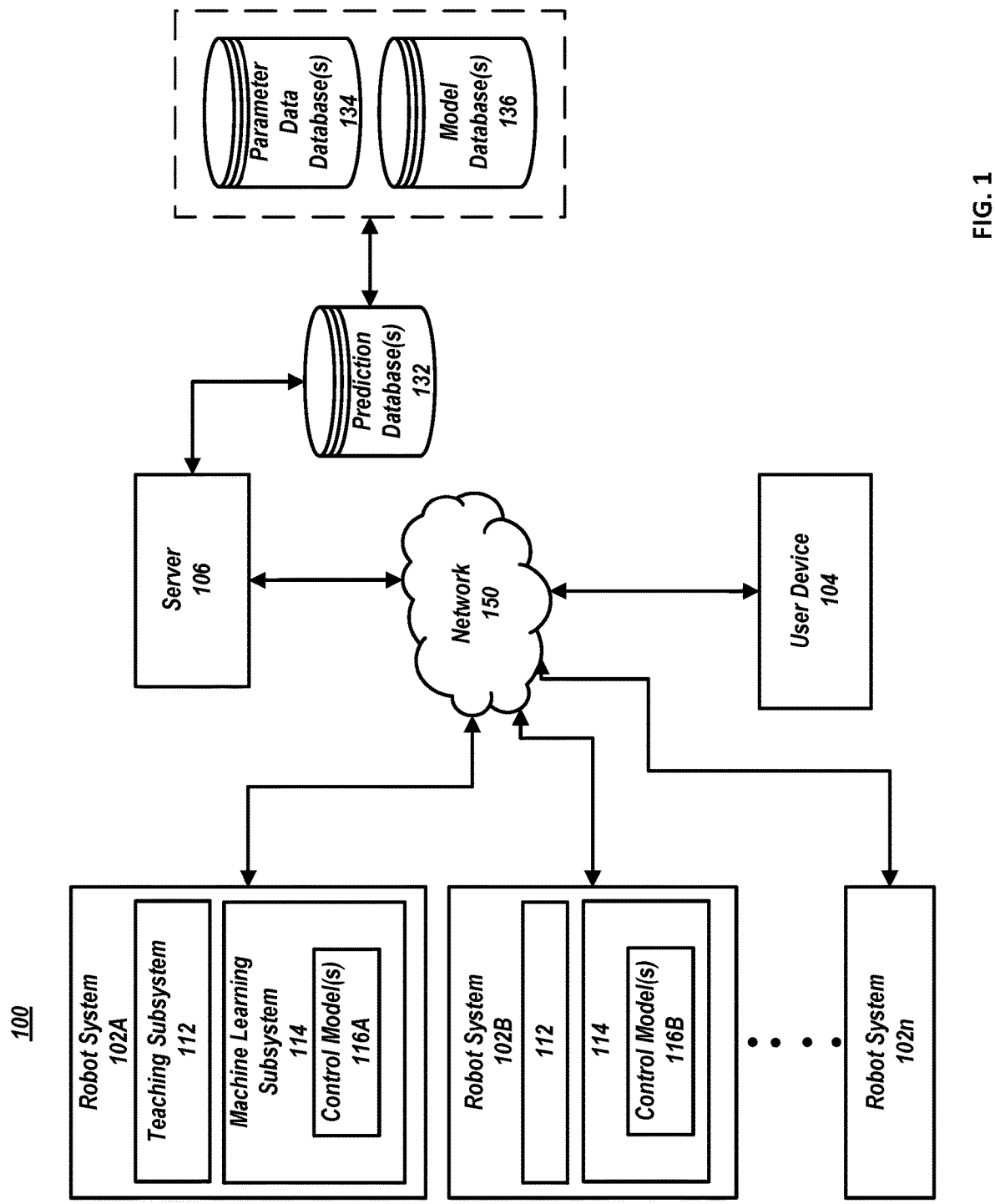
FIG. 1 is an example computing environment for operation of one or more robots, in accordance with some example embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of artificial intelligence and robotics. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Training an artificial intelligence model to control a complex dynamical system, like a robot (such as a humanoid robot or self-driving vehicle), to learn a task is time consuming and challenging. Initial training techniques may involve instructing a controller (and often multiple controllers) in communication with one or more actuators, sensors, or other robotic elements to perform actions (e.g., transitions between states) with the goal of completing some tasks and collecting feedback data corresponding to the completion of those tasks. In many cases, the controller may parse, pass, or otherwise convey instructions towards multiple other controllers constituent to a complex robotic system. Received feedback may be processed in accordance with a classification scheme to train a computer model (such as a neural network) to determine instructions for output in a feedback loop that receives feedback data as input based on or including the actuator data and the sensor data as the robot moves based on the output instructions to complete a task.

In some examples, a robot control model (or models) may pipeline an encoder model and a learning model that may be trained with end-to-end learning, or the encoder model may be trained and then the learning model trained. An encoder model may be operative to transform high-dimensional outputs of a robot's sensor suite into lower-dimensional vector representations of a slice in time. The lower-dimensional vector representation may be embedded (e.g., as a latent space embedding) within a latent embedding space. A learning model may be configured to update setpoints for robot actuators based on those vectors (e.g., based on their latent space embedding). Some embodiments may control robots with an even more expansive ensemble of such models, e.g., pipelining a convolutional neural network (or vision transformer) that extracts features from 2D image data, a geometric deep learning model that extracts features from 3D point clouds from depth sensors, and an encoder model that maps both sets of those features for a given time slice into respective vectors in latent embedding spaces, and a reinforcement learning model that controls the robot (e.g., outputs a time series of target setpoints of a plurality of actuators) based on a time-series of those vectors, each vector representing a time-slice or robot and environment state.

In many cases, performance of robots and other controlled dynamic mechanical systems is constrained by computing resources and particularly those used to implement machine learning techniques. For example, machine learning algorithms implemented on some computing architectures, particularly deep neural nets, are often constrained by available, low-latency memory and support for concurrency. The designer of a robot may desire for the robot to respond to new sensor data in, for example, a frame of video, within some relatively short duration of time, like less than 10 ms, less than 50 ms, less than 100 ms, or less than 500 ms of that frame of video (or other forms of sensor data) being captured. At the same time, parameters of machine learning models, like weights and biases of deep neural nets, often consume more memory than is available in relatively low latency memory of a central processing unit, like in L1 or L2 on-die cache, and as a result, additional latency can be imposed by the time taken to retrieve those parameters from higher-latency forms of memory, like dynamic random-access memory accessed over a system memory bus. Further, many central processing units have a relatively small number of cores available to exploit opportunities for concurrency in executing machine learning models, for instance, with typical central processing units having less than 32 or 16 cores available. Thus, many existing central processing units are not optimized for machine learning use cases relevant to the field of robotics or control of other dynamic mechanical systems.

One approach to mitigate these issues involves the use of hardware accelerators, which may be referred to as machine learning or artificial intelligence coprocessors in some domains. In some cases, these hardware machine-learning accelerators are implemented with application-specific integrated circuits that hardcode the machine learning algorithms, or supporting operations, like linear algebra operations (such as basic linear algebra subprograms, or BLAS, operations, like matrix multiplication and vector-matrix multiplication), into circuitry, which is expected to produce an order of magnitude or more improvement in performance in some cases. In some instances, hardware accelerators may also be implemented with field programmable gate arrays using similar approaches. In many cases, however, the use of hardware accelerators is constrained by their flexibility. The techniques by which machine learning algorithms or supporting operations are hardcoded into the wiring of these devices can, in some cases, limit their ability to generalize to a broader array of applications.

To mitigate these issues, some embodiments may implement a hybrid architecture in which subsets of sensors of a controlled dynamic mechanical system, like one or more sensors or each of a plurality of sensors, have outputs coupled to a hardware machine-learning accelerator for performing some or all of a pipeline of operations by which inferences (e.g., about system state, environment, action, etc.) are implemented to support control of the dynamic mechanical system. For example, some embodiments of robots and other controlled dynamic mechanical systems described herein may include a plurality of sensors of a modular system hardware design such that each sensor (or a grouping of sensors) is coupled (directly, in some examples) with special-purpose chipsets for performing a space (e.g., like a sub-space or latent-space) or other encoding of sensor data prior to downstream digestion by a higher-level component or model of the system. Special-purpose chipsets can take a variety of forms, including, but not limited to, example chips and processors described with respect to FIG. 3.

In some cases, each sensor is coupled to a hardware machine-learning accelerator, such as a hardware machine-learning accelerator implemented by, with, or within one or more of the above mentioned special-purposed chipsets, that is positioned relatively close to the sensor, like on the same printed circuit board or within 10 or 20 cm. In some examples, a sensor may be coupled to a hardware machine-learning accelerator ("ML Accelerator" or "Accelerator") via a relatively high-performance bus (e.g., a PCI Express 3, 4, or 5 or faster bus) rather than a via a network interface. Output of the accelerator may then be conveyed over a local network (e.g., a CAN bus or Ethernet) to a processor that implements control over the dynamic mechanical system, like a CPU connected to outputs of a plurality of such hardware machine-learning accelerators that are each coupled to different sensors, different types of sensors, or different subsets of sensors, each of which may correspond to a different type of sensor. In some embodiments, the ML accelerators may be arranged hierarchically in a tree topology, with leaf node ML accelerators receiving raw inputs from sensors and producing outputs that are then taken as input to intermediate level ML accelerators in two or more layers, with some or all intermediate layer ML accelerators receiving inputs from multiple upstream ML accelerators.

Embodiments of a hybrid computing architecture using specialized processors to handle encoding or decoding of space (e.g., latent space or sub-space) representations used to control dynamic mechanical systems are expected to reduce latency (e.g., by increased resolution of time-slices or by decreasing processing time of time-slices) in robot decision making based on outputs of one or more models like those described above. Embodiments are not limited to only one machine learning model (or type) or a specific collection of machine learning models, which is not to suggest that any other description is limiting. That said, various innovative techniques are described directed to various related ends, and embodiments are not limited to systems that afford these benefits, again which is not to suggest that any other description is limiting.

FIG. 1 depicts multiple robot systems as part of an example computing environment 100 within which the present techniques may be implemented. The computing environment 100 may include one or more robot systems 102, a user device 104, or a server 106. While various examples are discussed in relation to a single robot system, multiple such robot systems may operate within a given environment as shown. For example, activities of two or more robots may be coordinated, whether in a leader-follower configuration or by a downstream control model that outputs commands upstream to the robot systems. Additionally, while shown as distinct objects, functionality described below in connection with a given robot system 102, server 106, or user device 104 may be performed by any one device. Each of the robot system 102, the server 106, or the user device 104 may be implemented as one system or as separate systems. A given robot system 102 (which may be an individual robot), server 106, or user device 104 may communicate with each other via the network 150. In some examples, two or more robot systems 102 may communicate with each other via the network 150 or another network or wired or wireless communication link between the robots. While example communication links are shown between respective robots and the network 150, these communication links need not be persistent nor need to exist simultaneously within the context of the disclosure (which is not to suggest that communication links cannot exist simultaneously or cannot be persistent).

Environment 100 of FIG. 1 depicts a number of robot systems 102 (e.g., 3 or more) and contemplates use cases involving deployments of tens, hundreds, if not thousands or more robot systems. Example robot systems 102 may be incredibly complex, with hundreds or thousands of parts, many of which may be precisely controlled based on instructions determined by a control model of a robot system. Small differences or variances in those parts can yield to differences in control models between different robot systems 102. Additionally, example robot systems 102 may operate in different environments which may present varying challenges to robot system operation, whether due to impact on components, sensor readings, or variation in tasks.

Robot system 102A and robot system 102B (among other robot systems up to 102n robot systems), even when featuring similar (or what many would consider the same) parts or construction, may vary physically. For example, robot system 102A and robot system 102B may exhibit physical variances due to produced component tolerances, wear or frictional differences that evolve over time in a given robot, resistance (e.g., in signaling paths, components, or between components), etc., or installed orientation which may further result in tolerance stacking (or canceling) between different components, or which may otherwise result from different operating environments (e.g., battery capacity, response of dexterous members, interference affecting signal paths or sensor readings, or other components due to temperature or humidity or radiation or magnetic fields among other factors). These variances may produce differences in raw feedback data for a same input or same raw feedback data for different inputs between robots even though two robot systems 102 (or a collection thereof) are relatively similar. Thus the same robot may have different dynamics over time, and different instances of the same robot may have different dynamics. Each robot instance may thus require a robot-specific learning/teaching period that accounts for the unique characteristics of the robot instance and the environment within which it operates to achieve a threshold level of success or efficiency.

A robot system 102 may include a teaching subsystem 112 and a machine learning (ML) subsystem 114, or in some cases, aspects of one or both of these components may be hosted on server 106 (which may be a server system implemented with a plurality of servers providing various services corresponding to the functionality described herein). Training of a robot system 102 may include simulated performance of a task, capturing training examples by having a human control the robot (e.g., entirely) through performance of instances of a task, or both. For example, an operator (e.g., remotely) may input instructions via the teaching subsystem 112 to effectuate movement of the robot, such as to guide movements of the robot to complete a task. For a successful iteration of completing the task or a portion thereof, a sequence of latent space embeddings and corresponding operator commands may be captured and labeled collectively as corresponding to a successful instance of performing the task. Conversely, for an unsuccessful iteration (e.g., the robot failed to complete at least a portion of a task), a sequence of latent space embeddings and corresponding operator commands may be captured and labeled as corresponded to a negative result.

A ML subsystem 114 of a robot 102 may include a machine learning model, like a robot control model 116. In many deployments, and especially those involving complex robotic systems, a robot control model 116 may refer to a specific machine learning (ML) model or a collection of ML models or components of a ML model. Some embodiments of a robot control model 116 may include multiple robot control models or even multiple robot control models that each include multiple constituent ML sub-models (which may be trained separately or concurrently through end-to-end training). The ML models may include an encoder model, a reinforcement learning model, a computer vision model, a geometric deep learning model, a dynamic model, an actor-critic model, a reward model, an anomaly detection model, or a variety of other machine learning models.

The machine learning subsystem 114 may receive training data corresponding to a task based on the performance of the robot. While the above example uses a teaching subsystem 112 and operator inputs, a control model 116 or one of a plurality of control models may also determine and issue instructions (e.g., as described herein based on feedback data and current model parameters) to effectuate movement of a robot to complete a task. Various stop conditions, which may be indicated within a latent embedding space (or sub-space, such as based on outputs of an intermediate encoder model, which may be executed by a hardware ML accelerator) or actuator command space (e.g., to prevent damage to the robot), or other feedback signals, may automatically, or based on operator input, indicate whether the robot failed at completing the task. Feedback signals may also automatically, or based on operator input, indicate that the robot completed the task. Thus, some embodiments may continuously generate and classify data for training control models within the machine learning subsystem 114.

The machine learning subsystem 114 may store generated training data, which may be used by the machine learning subsystem or other system to train a control model 116 of a robot. In some cases, the machine learning subsystem 114 may store the training data, which may be offloaded to a server (e.g., 106) for processing to train a control model which may be uploaded to a robot system 102. In some examples, a server 106 or a machine learning subsystem 114 may train a robot control model 116A specific to a robot system 102A based on training data generated from multiple instances of the robot system 102A performing (or attempting to perform) a task. The training process may include multiple iterations of operator control inputs via the teaching subsystem 112 to guide the robot to complete a task or multiple iterations of the robot (e.g., with or without supervision) attempting to complete the task to generate training data, or both, the control model 116A may be iteratively trained based on newly generated training data (e.g., until attempts by the robot to complete the task reach a threshold ratio of success or efficiency, which is not to suggest that the control model 116A may not still be periodically updated to increase performance, but rather illustrate a threshed at which the control model 116A and thus the robot system 102A may be considered trained to perform the task to a standard or within certain criteria compared an untrained counterpart).

Training a robot system 102A, such as in accordance with the above-described training process, is expected to account for idiosyncratic properties of individual instances of tactile sensors, joints, members (e.g., dexterous or otherwise), tendons, image sensors, actuators or motors, or other equipment of the robot system 102A based on the collected feedback data. Additionally, such training is expected to account for environmental factors within which the robot system 102A operates to perform a task. A trained control model 116A of the robot system 102A thus may account for (e.g., learn to accommodate) properties of the robot system 102A for which it generates instructions to perform robot control actions based on robot state, such as to cause the robot to complete a task. The teach time (e.g., duration of the training process, which includes generating the training data) to develop the trained control model 116A, however, may consume a considerable amount of time. A lengthy teach time is typically overlooked for a simple task, replicated many times, with little variation. However, expected use cases of a robot system 102 may include deployment of a multitude of robots (e.g., three, tens, hundreds or thousands or more), in variable settings, with relatively frequent changes in tasks, making a need for excessively large training set sizes problematic.

Some embodiments of a control model 116 of a robot system 102, such as control model 116A of robot system 102A, may include multiple constituent models. For example, control model 116A may include a plurality of encoder models that process sensor outputs prior to consumption by other higher level models, like a reinforcement learning model. The different instance of the encoder models may be initialized based on parameters learned by other robot systems (e.g., transfer learning). Upstream encoder models, which may receive sensor outputs, may be trained (e.g., individually, or end-to-end with other downstream models) to account for idiosyncratic properties more efficiently than downstream models. Moreover, their outputs may minimize exposure of downstream models to idiosyncratic properties to reduce teach times. For example, an encoder model that processes output of a position sensor may output a determined position of an end effector coupled to a joint, like within a range of possible positions (e.g., considering a linear example for ease of explanation). Training of the encoder model may include learning normalizing positions of the end effector for output within the range of possible positions, and that training may be localized to that encoder model to isolate a downstream model from training on low-level sensor feedback. The downstream model may thus train on outputs of the encoder model within an expected range that bounds expected behavior of the end effector (e.g., 10 extended, 0 retracted) that may similarly be initialized based on parameters learned by other robot systems (e.g., transfer learning). Isolating downstream models from low-level sensor feedback that exhibits a high degree of variability idiosyncratic properties may reduce teach times by increasing the efficacy of transfer learning within complex robotic systems.

Some embodiments of robot systems 102 may include an even more expansive ensemble of control models 116. For example, a machine learning subsystem 114 may pipeline a convolutional neural network (or vision transformer) that extracts features from 2D image data, a geometric deep learning model that extracts features from 3D point clouds from depth sensors, and an encoder model that maps both sets of those features for a given time slice into respective vectors in latent embedding spaces, and a reinforcement learning model that controls the robot (e.g., outputs a time series of target setpoints of a plurality of actuators) based on a time-series of those vectors, each vector representing a time-slice or robot and environment state.

In example techniques described herein, various ones of the aforementioned models may be implemented within or by a hardware machine-learning accelerator of a special-purposed chipset. For example, at least some control models 116 may be implemented on hardware ML accelerators, but some other control models 116 may be implemented on general purpose chipsets. In some cases, one or more sensors are coupled to a hardware ML accelerator that executes an encoder model implemented by, with, or within one or more of the above mentioned special-purposed chipsets, that is positioned relatively close to a sensor that outputs feedback data, like on the same printed circuit board or within 10 or 20 cm. In some examples, one or more of a convolutional neural network, vision transformer, or geometric deep learning model may be implemented with a hardware ML Accelerator, such as in addition to a downstream encoder model implemented with a hardware ML Accelerator. Embodiments are not limited to only one ML model (or type) or a specific collection of ML models, which is not to suggest that any other description is limiting.

Sensors of a robot system 102 may output sensor data, like feedback data, which may be processed by one or more encoder models (or in some cases by other lower-level upstream models and then by an encoder model) to generate latent space embeddings based on the feedback data. The latent space embeddings may simplify processing of feedback data For example, an encoder may generate a latent space embedding (e.g., a vector representation) indicative of a state of the robot or the environment around the robot periodically (e.g., 30 times per second, 10 times per second, every two seconds, etc.). Thus, a latent space embedding may indicate a current position or state of the robot during the course of a task. Similarity scores based on a distance metric (e.g., Euclidian distance, Minkowski distance, cosine distance, Hamming distance, or a variety of other distance metrics) may be used to determine distances between latent space embeddings within the latent embedding space. Thus, for example, a distance between states, like between a predicted state and a desired state, or current state and a predicted state or desired state may be determined. Likewise, a distance between a predicted state or current state and one or more anomalous states may be determined, such as to indicate whether the robot is in (or is close to in), or an action of the robot may yield to (or is approaching), an anomalous state. One or more different thresholds for similarity scores may indicate whether a given latent space embedding corresponds to a desired or undesired robot state, such as indicated by records of states and their respective classification within the latent embedding space.

To increase resolution, e.g., increase frequency or decrease amount of time between time slices, low-level sensor outputs may be proceeded by a model, like an encoder model, implemented by or within a hardware ML accelerator. For example, a sensor or set of sensors may be coupled to a ML accelerator via a relatively high-performance bus (e.g., a PCI Express 3, 4, or 5 or faster bus) rather than a via a network interface. Output of a ML Accelerator may be conveyed over a high-performance bus, such as to a next ML Accelerator in a pipeline, or may be output on a local network, like a CAN bus or Ethernet to a processor that implements control over the dynamic mechanical system, like a CPU that receives output of a plurality of such ML Accelerators.

High-performance buses for conveying data between the sensors and ML Accelerators (or in some cases between two ML Accelerators) may have 2×, 4×, or even multiple orders of magnitude greater throughput than commonly employed local networks (e.g., Ethernet networks) or network busses (like a CAN bus). For example, a PCI Express 3 bus may support a throughput of approximately 1 GB/s per lane, and a PCI Express 5 (or higher) bus may support a throughput of 3.9 GB/s per lane or more, and PCI Expresses busses may include multiple lanes, such as x4, x8, x16 lanes. Thus, for example, a x16 PCI Express 3 bus may have a throughput of approximately 16 GB/s and a x16 PCI Express 5 bus may have a throughput of approximately 63 GB/s. Ethernet transport, by contrast, such as 10 GbitE for example, has a throughput of 1.25 GB/s, which equates to approximately 1 lane of PCI Express 3, and thus $\frac{1}{16}^{th}$ that of a x16 PCI Express bus. While Ethernet transport speeds (e.g., for network interfaces) up to 100 GbitE may be available (throughput of 10.25 GB/s), contemporary implementations of PCI Express, among other high-speed buses, can greatly exceed these speeds. For example, present next-gen iterations of PCI Express, like PCI Express 6, are expected to provide x16 throughput of more than 100 GB/s (e.g., approximately 121 GB/s), which is an order of magnitude (e.g., 10 times) greater than the throughput of 100 GbitE and multiple orders of magnitude (e.g., 1000 times) greater that of commonly employed 1 GbitE. A bus is a "high-speed bus" if it has a throughput bandwidth of 12 GB/s or more. Some embodiments may only use a subset of the capability of a high-speed bus.

The machine learning subsystem 114 may include multiple such encoder models (or other models) executing on respective ML accelerators. In some examples, the ML accelerators (and thus the respective models implemented by the ML Accelerators), may be hierarchically organized within the context of the machine learning subsystem 114. For example, a robot control model 116 may include a reinforcement learning model trained at least in part via a reinforcement learning process, and the reinforcement learning model may take, as input, outputs of one or more encoder models. The encoder models executed by the ML Accelerators may simplify the input parameter space of the reinforcement learning model, which, due to complexity may be executed on a general purposed central processing unit. Reduction of the number of input parameters, for example, may reduce latency of model execution over a stream of input data.

Similarly, an encoder model may take, as input, (instead of, or in addition to, sensor outputs) outputs of one or more upstream encoder models (or other models) within the hierarchy, like a tree. As an example, the ML subsystem 114 may include three layers of encoder models, with the layer-1 encoder models receiving inputs from sensors and providing output to layer-2 encoder models, each of which may process outputs from (e.g., two or more) layer-1 encoder models and provide output to layer-3 encoder models, and so forth for hierarchies including three or more layers of encoder models. A downstream layer (e.g., layer-3) encoder model (or models), in the above example, may then provide output to the reinforcement learning model (or another model). Each (or at least some, such as upstream encoders) of the encoder models may transform relatively high-dimensional outputs of a robot's sensor suite into lower-dimensional vector representations, such as for each time slice of a feedback loop. The lower-dimensional vector presentations may be embedded (e.g., as a latent space embedding) within a latent embedding space, and the reinforcement learning model may be configured to update setpoints for robot actuators based on those vectors (e.g., based on their latent space embedding).

A control model 116 of a robot system may be trained to effectuate operations of the robot system to perform a task. Completion of a task by a robot system may include the performance of a sequence of actions by the robot, like a trajectory, to transition between a starting point to an ending point corresponding to the completion of the task, or completion may be marked by some change in state of the environment of the robot. As the robot performs a sequence of actions, sensor data may produce a sequence of vector representations (e.g., latent space embeddings) indicating how the robot and its environment are responding to commands. Thus, for example, a trajectory may produce a sequence of latent space embeddings that indicate how the robot and its environment have evolved over time.

A control model 116 may be trained on a set of sequences of embedding vectors (among other data). Each member of the set of sequences of embedding vectors may correspond to an instance in which a robot previously performed a task. For example, each member may correspond to an instance where a robot changed a tire on a vehicle or performed some other instance of another task by a sequence of operations. Each embedding vector may encode a plurality of channels of sensor data from a robot system 102 in a latent embedding space for (or during) a time slice (e.g., a duration of time less than 1 second, 500 ms, 100 ms, 50 ms, or shorter) occurring during the instance of performing the task. For example, the sensor data may include images (e.g., including video) taken from cameras located on the robot or around the robot (e.g., with the robot or a workpiece in a field of view of the cameras). Each sequence of the set of sequences may have embedding vectors corresponding to different states of the robot and the environment while completing the task.

Beginning a task, such as in the case of a robot receiving a wheel with a tire to mount on the wheel (or some other task), the robot may collect input data from the plurality of channels of sensor data. One or more encoder models of the control models 116 may be configured to transform the input into an embedding vector in the latent embedding space (or a sub-space). In some examples, the plurality of channels of sensor data may be transformed into embedding vectors within different sub-spaces of the latent embedding space by a first set of encoder models coupled to the sensors and a second set of one or more downstream encoder models may transform input embedding vectors of different sub-spaces into an embedding vector within a joint sub-space (which may combine the features of two or more sub-spaces), or an embedding vectors within the latent embedding space (e.g., like a most downstream embedding space).

Encoder models may output resulting embedding vectors, representative of sensor feedback data, which may be ingested by other control models. For example, another control model 116, based on feedback data (e.g., like an embedding vector within the embedding space) and a desired trajectory (e.g., an embedding vector of a target pose within the embedding space), may be configured to determine an output to control the robot. For example, an embedding vector may indicate that an end effector is off by 1 centimeter in a given direction from a target pose in a trajectory. In response, a control model may instruct an actuator to correct the difference. The robot may collect new input data from the plurality of channels of sensor data as sensor feedback data, a new embedding vector may be determined based on the sensor feedback data, and further control of robot movement along the trajectory may be determined based on the new embedding vector (e.g., in a feedback cycle until detection of completion of the task).

In order to perform tasks, like in the above example, a robotic system 102 may include a combination of members, joints, actuators, and tendons configured to grasp an object, like one or more arms (e.g., appendages). Joints may couple and permit movement of coupled members with varying degrees of freedom and tendons (e.g., like wire, chain, etc.) in combination with actuators may effectuate movement of one or more of those members. Various sensors, such as tactile or force sensors or strain sensors or pressure sensors, along with cameras, inertial measurement units, and the like may output sensor data corresponding to movements and interactions of components of the arm with itself or other objects. Sensor data may be collected from various image or distance sensors, which may be processed, such as by encoder models, to output vectors indicative of position of the arm (or members thereof) within the environment and other environmental data. For example, as the robot moves towards an object, sensor data including images showing the environment around the robot, data indicating positions of legs and arms of the robot, etc. may be collected and processed by the encoder models for ingestion by downstream models that may output control signals to effectuate further movement of the robot towards (or around) the object.

Sensor data may be obtained by hardware ML accelerators while an action or a portion of an action is performed or after an action is performed. Obtained sensor data may be collected periodically (e.g., in a relatively continuous fashion), such as thirty times per second, 120 times per second, or more, etc., and encoded by a hardware ML accelerator for downstream processing. Some examples of sensor data encoded by a ML accelerator may be augmented with an associated data value to indicate whether a value was increasing or decreasing or steady within a given collection period (e.g., ML accelerators coupled to sensor outputs or outputs of other ML accelerators via a high-speed bus may read and process sensor data with a higher frequency than other downstream control models). Sensor data may include imaging data read from one or more imaging devices (e.g., LiDAR, cameras, etc.) of the robot. Sensor data may include proximity data from one or more proximity detection devices (e.g., LiDAR, radar, soundwave, etc.). Sensor data may include position data from servo motors or stepper motors indicating the reported positions of one or more part of the robot, the reported positions of one or more parts of the robot relative to other parts of the robot, battery level, power consumption, motor current, or a variety of other information associated with state of the robot. Sensor data may include information obtained from a motor position sensor of the robot (e.g., located in arm, member, joint, or other part of the robot system 102), a touch sensor located in a part of the robot system 102 (e.g., a finger of the robot system 102), or a motor current sensor of the robot.

In some cases, each sensor is coupled to a hardware machine-learning accelerator, such as a hardware machine-learning accelerator implemented by, with, or within one or more of the special-purposed chipsets described herein, that is positioned relatively close to the sensor, like on the same printed circuit board or within 10 or 20 cm. In some examples, multiple sensors may be coupled to a special-purposed chipset. The special-purposed chipset may perform a space (e.g., like a sub-space) encoding of sensor data prior to downstream digestion by another encoder or higher-level model. In some examples, a sensor may be coupled to a hardware machine-learning accelerator ("ML Accelerator" or "Accelerator") via a relatively high-performance bus (e.g., a PCI Express 3, 4, or 5 or faster bus) rather than a via a network interface. Output of the accelerator may then be conveyed over a local network (e.g., a CAN bus or Ethernet) to a processor that implements control over the dynamic mechanical system, like a CPU connected to outputs of a plurality of such hardware machine-learning accelerators that are each coupled to different sensors, different types of sensors, or different subsets of sensors, each of which may correspond to a different type of sensor. In some embodiments, the ML accelerators may be arranged hierarchically in a tree topology, with leaf node ML accelerators receiving raw inputs from sensors and producing outputs that are then taken as input to intermediate level ML accelerators in two or more layers, with some or all intermediate layer ML accelerators receiving inputs from multiple upstream ML accelerators.

Different robot systems 102 may operate within different environments. For example, a robot system 102A may perform a task in different lighting conditions than robot system 102B. Environmental variances such as lighting conditions, radiation, magnetism, temperature, or humidity, may yield differences in raw feedback data. Other environmental factors may also affect how robot systems 102 in different environments complete a same or similar task. For example, robot system 102A may encounter doors with round doorknobs and robot system 102B may encounter doors with levers, or robot system 102A may operate in a room with bright lighting and minimal visual background clutter (e.g., reducing background interference within image data) and robot system 102B may operate in a room with dim lighting and a relatively high degree of visual background clutter (e.g., increasing background interference within image data). Such example differences in environmental factors may increase difficulty of processes to accurately perform classifications (e.g., with less than a threshold amount of error) or perform classifications within a threshold amount of time under given conditions (e.g., resolve an object for collision avoidance at different velocities of movement). Different robot systems 102 may be upgraded or refreshed (e.g., with new, updated, or replacement parts) at different times based on different maintenance schedules due to uptime or environmental factors. In some cases, updating a sensor or other component of a robot system 102 may yield differences like those described above between a prior version of a control model and an updated control model (e.g., after some re-training) that accounts for changes in raw feedback data.

The above and other differences between robot systems 102 and the environments the respective robot systems operate in are typically addressed by robot-specific training of a control model for the robot system within the environment which the robot system operates. As a result, a control model 116A of a robot system 102A may include numerous parametric differences from a control model 116B of another robot system 102B after training of each robot (e.g., to reduce their error in performing the same or different tasks). Robot-specific training of a control model of a robot system from an initial state, while accounting for robot system and operational environment differences, can result in lengthy robot teach times.

To reduce teach times, a hybrid architecture may simplify training based on where those parametric differences are addressed within a robot a control system (e.g., close to the sensory feedback path). For example, relatively low-level hardware accelerators (e.g., on sensor, or close to sensors, such as to obtain sensor feedback data) are expected to minimize exposure of downstream control models to parametric differences. Transfer learning may be applied to sub-models deployed via hardware accelerators that are in a pipeline, particularly those closer to the sensors. It is expected that lower-level features in an inference pipeline will be more invariant among different use cases while higher level models (and their input features) are expected to vary more depending upon the task at hand. As such, a hybrid architecture, like that described herein, is expected to be particularly well-suited for implementation of on hardware machine-learning accelerators that trade-off some flexibility for higher performance.

Control model (e.g., 116B) and, optionally (which is not to suggest that other features are not also optional), parameters of a plurality of trained control models of respective robot systems (e.g., 102B to 102n) may be leveraged to expedite training of a new robot system 112A with various forms of transfer learning described herein. A subset (or all) of the trained robotic systems (e.g., 102B to 102n) may perform a same or similar task (or tasks), different ones or subsets of the robotic systems may perform different tasks, and different ones or subsets of the robotic systems may perform some similar tasks and some different tasks. One or more of the trained robotic systems (e.g., 102B to 102n) may be trained to perform a same or similar task to that which the new robot system 112A is desired to perform, optionally within a same or similar environment within which the new robot system 112A is desired to operation. However, no requirement exists for a trained robot system (e.g., 102B to 102n) to already be capable of performing a task that the new robot system 112A is desired to perform, or to operate within a same or similar environment within which the new robot system is desired to operate to perform the task.

In some cases, transfer learning may be implemented between a single pair of robots, or for a single robot across tasks or environments. Or some embodiments may apply transfer learning techniques that leverage trained models across a larger fleet of robots. There may be multiple robot systems 102 (e.g., tens, hundreds, thousands, or more in a fleet) that perform tasks and send data (e.g., like their trained models or data like that in the training sets above, including data from fully automated performance of tasks without human intervention) to a server 106. For example, a machine learning (ML) subsystem 114 of a robot may store collected data (which may include training data) and send some or all of the collected data to the server 106, such as for iterative training processes or to otherwise report on operation of the robot. The data transmitted to the server 106 may include control model data, such as parameters of a robot system, or one or more control models themselves. For example, in some example embodiments, the data sent to the server 106 by the ML subsystem 114 of a robot may include values of parameters of a control model of the robot, or differences in values of parameters between iterations or versions of the control model of the robot (e.g., in examples where one or more control models are updated by the robot system). In some example embodiments, the data sent to the server 106 by the ML subsystem 114 of a robot may include data (e.g., training data) by which the server 106 may train or update the control model of the robot, and the server may store (e.g., in addition to providing an updated control models to a robot) determined values of parameters of the control model of the robot, or differences in values of parameters between iterations or versions of the control model of the robot. Different ones of the robot systems (e.g., depending on their role or current efficiency in performing a task) may report data to the server 106 in different ways, such as periodically (e.g., after training) or streaming (e.g., during training or which pertains to operation), or stream some subset of data and periodically report another subset of data.

Some examples of the environment 100 may include a prediction database 132, like that illustrated, which may store data about (e.g., trained or new) robots and predictions for expediting training of new robots. For example, the prediction database 132 may include one or more model databases 136 that store data about one or more robots and their respective control models (e.g., one or more iterations thereof, like architectures, hyperparameters, and model parameters adjusted through training), operational environment, task (or tasks), or other data. In some embodiments, the model databases 136 may store parameter values (e.g., values of weights, biases, etc.) of control models 116 of robot systems 102. For example, the model database 136 may include a record (or a number thereof) corresponding to robot system 102B, which may contain parameters of the control models 116B among other data corresponding to robot system 102B (e.g., like operation environment and other data like that described above). A record corresponding to robot system 102B may contain parameters for a plurality of models, such as in examples where a control model 116B includes a plurality of constituent models or a plurality of control models 116B operate in connection with each other to control the robot system, or other combinations. A record corresponding to robot system 102B may also contain parameters for a plurality of versions or iterations of a model, such as for different iterations of a control model 116B (e.g., obtained over time as the control model is iteratively trained) of the robot system 102B. The model database 136 may store a plurality of records containing data like that described above for a plurality of robot systems (e.g., 102B through 102n).

Embodiments of the prediction database 132 may include a parameter data database 134. The parameter data database 134 may store results or determinations based on data stored within the model databases 136. For example, the parameter data database 134 may store results of an analysis of robot control model data and store a determination based on the results of the analysis. In some examples, the parameter data database 134 may store one or more predictions, which may be based on one or more of the data stored within the model databases 136, results within the parameter data database 134, determinations within the parameter data database 134, and information about a new robot system.

In some embodiments, the server 106 may store and operate on data, like that described above, within the prediction databases 132. For example, the server 106 may receive data from robot systems, store the data, and perform one or more operations on the data. The server 106 may store results or other data based on those operations within the predication databases 132. For example, the server 106 may execute one or more of the processes by which some embodiments expedite robot teach through initialization based on previously trained robots.

In some embodiments, the server 106 may analyze parametric differences (e.g., differences in values taken by various corresponding parameters, like a given weight or bias) between control models to determine (e.g., predict) parameter values of a control model for another robot or to tune hyperparameters used when adjusting those parameters in the model to be trained. The parametric differences may correspond to differences between control models of different robot systems (e.g., 102B through 102n), but which may be of a same or similar construction. In some examples, the parametric differences may correspond to differences between iterations or versions of control models of a same robot system (e.g., 102B). Embodiments of the server 106 may perform one or both of the above analyses, among other analyses described herein, to determine information about parameter values (e.g., weights, biases, neural network, etc.) and hyperparameter values of robot control models.

The server 106 may analyze parametric differences between control models of different robot systems within their respective environments to identify one or more segments of a parameter set of control models of robotic systems trained to perform one or more tasks. For example, the analysis may identify a segment (e.g., like a subset) of parameters that remains the same, or relatively stable, between the control models of the different robot systems. For example, a relatively stable parameter may have a value (or values) that exhibit variation of less than a threshold amount across a plurality of robot systems. Another identified segment of a parameter set may exhibit variation of more than a threshold amount across a plurality of robot systems. In some embodiments, a single robot system may (e.g., initially) provide a basis for the analysis. For example, values of a parameter set of a control model of a robot system may be sampled or stored between training to perform different tasks, or between training iterations for a same task, and may be utilized to bootstrap a collection of parametric differences of control models (e.g., based on changes between versions or iterations of the control model of the robot system). In some examples, an analysis of parametric differences of control models resulting from training of a robot system to perform different tasks may indicate segments of a parameter set that remains the same, or relatively stable, or differ more than a threshold amount between the control models of a same robot system. In some examples, an analysis of parametric differences of control models across training iterations of a control model of a robot system may indicate segments of a parameter set which converge more quickly on their trained values. Some examples of the analysis may process parametric differences that may occur between trained control models of a single robot system, as described above, for a plurality of other robot systems for which those parametric differences are also tracked (e.g., during the training, over time, etc. for each robot system), which may indicate trends in parametric differences between tasks or which parameters converge more quickly across a collection of robot systems.

In some examples, the server 106 may form one or more predictions based on information stored within the predication databases 132. For example, the server 106 may analyze one or more records of models stored within the model database 136 to make various inferences about the parameters of those models and store the results in the parameter data database 134. For example, the server 106 may obtain records of a plurality of models. In some cases, the server 106 may select one or more records corresponding to a given type of model or even a specific model within the context of the ML subsystem 114 of example robot systems 102 described herein. For example, the server 106 may select records corresponding to encoder models, or anomaly detection models, among others described herein (e.g., with reference to FIG. 2 or elsewhere).

In some cases, such as where various models of same or different types are pipelined, the server 106 may select a subset of record corresponding to the sub-model type. For example, the server 106 may select records corresponding to a plurality of encoder models at a given location within a pipeline (which in some cases may have multiple branches, like of a tree, and selection of record may correspond to a given branch and depth in the pipeline of the branch). In some examples, a subset of records corresponding to instances of encoder models that processes sensor data for a first arm may be selected from records of encoder models, such as in use cases where other instances of encoder models process sensor data for a different arm, or sensor data for a torso of the robot, or instances of encoder models that process outputs of those models at a different stage in the pipeline. Records for other types of models may also be selected with some degree of specificity, such as to select records corresponding to instances of anomaly detection models.

The plurality of instances of models represented in a set of records selected by the server 106 for analysis may thus have at least some commonality, such be of a shared type (e.g., a recurrent neural network (RNN) or other neural network) and trained (e.g., may be in different stages of training but have at least some training) to perform a similar type of task, such as controlling a robot or one or more aspects of a process for controlling a robot (e.g., generate a latent space embedding, determine an action, predict a trajectory of an action, detect an anomalous state, output rewards for reinforcement learning, etc.). In some examples, such as for encoder models, which may include configurations of hardware machine-learning accelerators, may include a selection of models or configurations for encoders that handle a same type of sensory input data, like frames of a video or touch sensor array outputs. Additionally, in some cases, the selection may be further refined by local on a robot system. For example, a selection of models corresponding to a left side of a stereoscopic camera system may be selected, and another selection of models may correspond to a left side of a stereoscopic camera system, while another selection may correspond to wide angle camera systems. Additionally, the robot system 102 (or systems) to which the plurality of instances models represented in the set of record selected by the server 106 for analysis may also share a relative degree of commonality either in whole or at least with respect to the subsystem within which the model instances operate. For example, records of instances of encoder models that process sensor data for an arm (or given arm) of different robot systems may be selected provided the arms are of similar configuration even where other aspects of the robot systems differ.

In some cases, the selected set of records may correspond to models of relatively low-level hardware accelerators (e.g., on sensor, or close to sensors, such as to obtain sensor feedback data) within a pipeline, some examples of which may be an encoder model or provide sensor data to an encoder model. Transfer learning may be applied to sub-models deployed via hardware accelerators that are in this pipeline, particularly those closer to the sensors. It is expected that lower-level features in an inference pipeline will be more invariant among different use cases while higher level models (and their input features) are expected to vary more depending upon the task at hand. As such, a hybrid architecture, like that described, is expected to be particularly well-suited for implementation of on hardware machine-learning accelerators that trade-off some flexibility for higher performance. For example, by accounting for parametric differences close to the sensory feedback path, it is expected that downstream control models shielded from those differences may be more apt to application of transfer learning. For example, it may be expected that parametric differences that cause some fluctuation in a given lower-level encoder may be muted in the outputs that are observed by downstream control models. Thus, for example, it is expected that a control model initialed by transfer learning may be able to accurately resolve robot state and thus more apt to training via scripts or other iterative training while performing a desired function (e.g., potentially less efficiently, at least initially) as opposed to requiring a lengthy human-assisted training process at startup.

The server 106 may analyze an obtained record of a model, or a plurality of records of instances of a model or models, such as a record or set of records selected as described above, to determine inferences about the parameters of one or more models. The selected records may correspond to models having a similar (or the same) input/output schema, and thus afford a comparison of parameters of those models. In some embodiments, the server 106 may determine a distribution of values (e.g., biases, weights, or activation thresholds, such as for a given neuron or node within a neural network) of respective parameters in a set of parameters. The server 106 may determine, based on the distribution, a range of the reported values within the parameter space, and optionally one or more thresholds, such as based on a standard deviation (or multiple thereof) of the distribution of values. In some cases, a measure of central tendency may be identified for the value of the parameter, like a mean, median, or mode. These metrics may be analyzed relative to one or more rules that infer whether the values of the parameter converge on a given value or within a range of values for the parameter (e.g., based on standard deviation or other metric). The server 106 may, in some cases, identify edge cases depending on model type to assign confidence to whether an identified range of values for the parameter corresponds to a threshold for a desired or undesired behaviors (e.g., like grasping an object with a threshold amount of force but below another threshold, or like over stressing a tendon or joint by attempting to drive an actuator of the tendon or joint beyond a stop condition), and determine an associated operator and threshold for the value that indicates (e.g., 90% confidence value >0.7 or 0.5>value >0.3, etc.). In some cases, the server 106 may analyzing training iterations of a model as reported in the records, such as to determine directions of operators for thresholds. For example, if values less than 0.7 for a parameter across one or more training iterations (optionally across a plurality of models) correspond to a high number of undesirable robot state classifications, the server 106 may indicate a high confidence in a value of >0.7 for the parameter as more likely to yield desirable operation. In some cases, the server 106 may determine, for a parameter set of a given type of model, whether there is a high confidence a value of a parameter in the set will fall within a given range or will not be above or below a given threshold. The information about parameters and their values determined by inferences like those described above may be stored within the parameter data database 134 by the server 106. The server 106 may update these determinations as records are updated within the model database 136 to leverage existing deployments and their training experience to refine inferences about parameter values of robot control models 116.

The server 106 may leverage the information stored in the parameter data database 134 to initialize parameter values of a new model and indicate rules for adjustment of parameter values based on performance of the new model during training. Thus, for a new instance of the model, such as for an untrained system implementing the model, knowledge may be transferred based on the trained models (or based on their training experience) by a selection of values (e.g., initial values, and ranges of adjustment for those values) for a parameter according to the ranges, thresholds, and inferred rules for parameter values.

While it is expected that some parameters will have values that vary more substantially during post-transfer training, on-robot training may be significantly reduced, as the distance the model evolves through parameter space during training is expected to be reduced relative to other approaches. In some examples, the server 106 may improve simulated annealing techniques in accordance the above-described rules for parameter value selection, and with a reduced number of training operations, because a large search space (e.g., for a parameter value and combinations thereof across a plurality of parameters) may be significantly decreased. In some cases, these approximations of global optimization may approach the accuracy afforded by high-cost and time consuming but precise local optimum algorithms such as gradient descent or branch and bound (that in some use cases with high-dimensionality data may be practically precluded from use, which is not to suggest that these higher-cost approaches are disclaimed).

Moreover, by the above inference of rules for parameters values, exploration by adjustment of parameter values is not prohibited during training, but rather guided to within a sub-space of parameter values for which there exists a high confidence of a parameter value falling even if the full space were explored. In some examples, ranges or thresholds for parameter values may be expanded, such as by 10% or 20%, to afford a higher degree of exploration. In some examples, an expansion value for a range of a threshold that affords a greater degree of exploration may be determined based on a standard deviation value for the distribution of reported values and applied to a measure of central tendency (e.g., rather than the center of the distribution). In some examples, parameter values of a parameter set may be initialized to random values that are not prohibited by the rules inferred for the parameter.

In some examples, a user device 104 (either directly or via the server 106) may issue instructions to a robot system 102.

For example, the user device 104 may issue instructions that cause one or more actuators of robot system 102A to adjust to an indicated setting. In some examples, the user device 104 may include an interface by which actions of a user cause the user device to issue instructions. In some cases, the interface may include one or more interactive units or controllers (e.g., that each may correspond to or control one or more different actuators, joints or members of the robot system 102A) which the user manipulates to generate control inputs, which may include information about displacement, acceleration, or other control metrics (e.g., of the one or more different actuators, joints or members) that are mapped to motors, servos, etc. of the robot system 102A to which instructions based on the control inputs are issued.

In some examples, one or more scripts may be configured to output instructions, or a sequence of instructions. In some examples, the instructions or sequence of instructions may be generated by a user device 104 as described above and stored, such as to the server 106. In turn, a user device 104, server 106, or robot system 102 may execute a script to generate instructions for the robot system 102. In some examples, an initialization script may be configured to bias motors, servos, etc. to a desired initial state, such as prior to executing one or more other scripts that cause the motors, servos, etc. of the robot system to transition the robot system to some next state. Placing a robot system 102 in an initial state, whether manually or via an initialization script, may decrease learning times when using transfer learning techniques. For example, a robot system 102 (e.g., 102A) for which one or more control models 116A are initialized with parameters from, or based on those, of other robot systems (e.g., 102B, 102n, etc.) that is placed in an initialization state may generate observed sensor data from the initialization state. The observed sensor data may be compared to that recorded by other robot systems in a similar initialization state (or an observed range or a measure of central tendency in sensor data recorded by one or more other robot systems). In some examples, parameters of one or more control models 116A of the robot system 112A may be selected from one or more models (e.g., of or based on those of other robot systems) stored within the model database 136. For example, for a given one of the control models 116A, such as an encoder model, parameters may be selected from an encoder model within the model database. The encoder model within the model database may be selected based on distances between observed sensor data values by the robot system 102A and (e.g., prior) recorded sensor data values (e.g., corresponding to an initialization state) for the model within the database 136. For example, the encoder model for which distances between observed sensor data values of the robot system 102A and prior recorded sensor data values from a similar state (e.g., initialization or other state) are minimized (e.g., globally, or for a subset of values) may be selected from among a plurality of other encoder models. In some cases, objective functions, or distance metrics, by which the selected encoder model within the model database is trained may be selected for training the given one of the control models initialized based on the parameters of the model from the database. Alternative embodiments omitting transfer of parameters from a trained model within the database 136 to that of an untrained model of a robot system 102 are not disclaimed, and processes discussed below are expected to be applicable in both scenarios, among others.

Figure 2A:
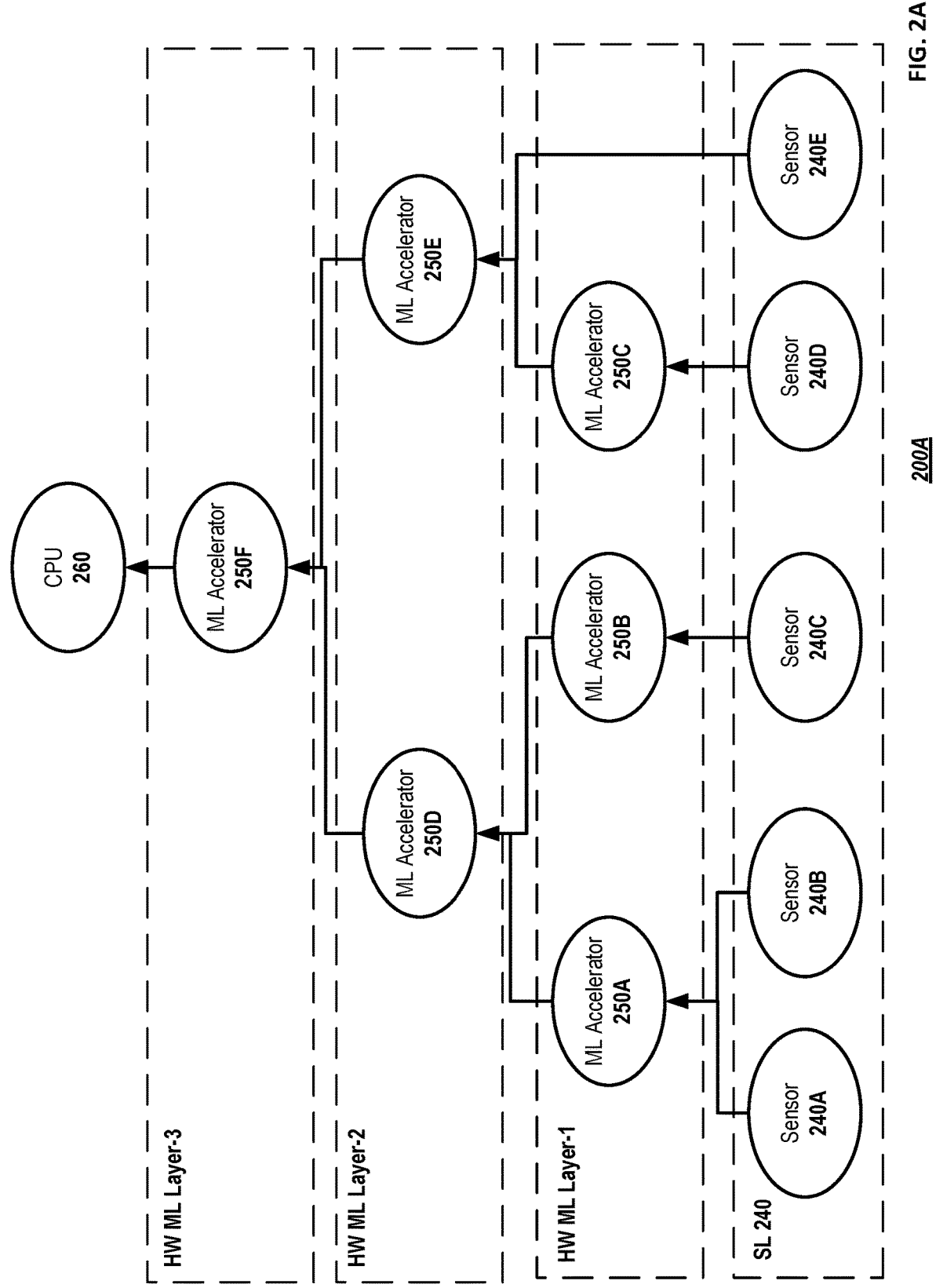
FIG. 2A illustrates an example hybrid computing architecture including one or more hardware encoders by which channels of sensor data are processed prior to ingestion by downstream control models, in accordance with some example embodiments.

FIG. 2A illustrates an illustrates an example hybrid computing architecture 200A including one or more hardware encoders by which channels of sensor data are processed prior to ingestion by downstream control models, such as of a robot system, like those discussed with reference to FIG. 1. While several encoders 250 are illustrated, embodiments may use fewer encoders, or more encoders, as might be expected to satisfy different design criteria of different robot systems. Additionally, examples may include additional or fewer layers (e.g., less than 3 encoder layers, or more than 3 encoder layers) of encoders. Example robot systems, however, may include at least one encoder 250 (e.g., like encoder 250F), which, in some examples, may be implemented within another model. One or more of the encoders 250 may be implemented with one or more machine learning hardware accelerators or may be implemented by a model executing on a more general purpose computer processor.

FIG. 2A, as shown, depicts a hierarchy comprising multiple encoder layers that process sensor output. The illustrated hierarchy may be logical, physical, or a combination of both. The example sensor and encoder configuration 200A as shown includes a sensor layer 240, which may correspond to a suite of sensor (or other elements) of a robot system from which feedback data is collected. The sensor layer 240 may thus include a plurality of sensors 240A-E, which may include one or more computer vision sensors (e.g., various cameras, LiDAR, etc.), proximity sensors (e.g., ultrasonic, etc.), tactile or force sensors or strain sensors or pressure sensors, inertial measurement units, and the like, among other sources of feedback data, like servos, stepper motors, actuators and the like. These or other sensors may correspond to a sensor layer SL 240 in the hierarchy, which in some cases may be visualized as having a tree (or tree-like) topology.

Encoder 250F is, as shown, representative of a downstream encoder model. Encoder 250F may output vectors that may be embedded within an embedding space, like a latent embedding space. Each output vector may correspond to current state of a robot system based on sensor feedback data. In some examples, one or more CPUs 260 may process the outputs of the downstream encoder model 250F. For example, a CPU 260 may execute a control model that compares a state output (e.g., vector within the latent embedding space) from the encoder 250F. A vector output by the most downstream encoder model 250F may be a representation of system state based on the sensor feedback data ingested from the sensor layer 240. The downstream encoder model 250F need not ingest each channel of sensor data directly, but rather may ingest representations of the sensor data from those channels that are output by upstream encoders (or other models, for example, an upstream model may transform or pre-process sensor output, which may then undergo dimensionality reduction by an encoder, but in various examples, a model may perform both operations).

Accordingly, encoder 250F may ingest sensor feedback data from upstream encoder models (e.g., 250D, 250E) as shown, or from sensors (e.g., 240A-E) of the sensor layer 240. Each encoder 250 may perform dimensionality reduction on inputs, but the amount of reduction may vary, such as whether an encoder is performing reduction on encoder outputs, sensor outputs, a combination thereof, and the type of data. For example, encoder 250F may reduce dimensionality of inputs received from encoder models 250D, 250E by 2×-10×, but encoder 250B may reduce dimensionality of inputs received from sensor 240C by 10×-100× or more. Similarly, an encoder model 250C that receives input from a computer vision sensor (e.g., sensor 240D) may reduce dimensionality of received inputs by 1000×, while an encoder 250B that receives input from a touch sensor matrix may reduce dimensionality of received inputs by 10× or 100×. The reduction measures indicated above are intended as examples based on observations in some use cases and should not be construed as limiting (e.g., an upstream encoder may reduce dimensionality computer vision sensor output data by 10× and a subsequent downstream encoder may further reduce the dimensionality by 100× to result in a 1000× reduction, or some other amount of reduction).

Various example configurations are shown. For example, an encoder 250A may receive inputs from two or more sensors 240A, 240B, or an encoder 250B may receive inputs from a single sensor 240C, or an encoder 250E may receive inputs from one or more encoders 250C (which receives inputs from one or more sensors 240D) and one or more sensors 240E. A sensor and control configuration 200A may include all or some of the example configurations noted above, or sensor feedback data from the sensor layer 240 may feed into a single encoder (e.g., 250F) without any intervening encoders.

Layer 1 and layer 2 encoders, like the downstream layer 3 encoder, may output vectors within embedding spaces. While the downstream encoder 250F outputs vectors within a latent embedding space that are representative of the upstream data collected across the entire sensor suite, the layer 2 (e.g., intermediate) encoders 250D, 250E, may output vectors within respective embedding subspaces that are representative of data from sensors 250A-C and sensors 250D-E, respectively. Similarly, each of layer 1 upstream encoders 250A, 250B, 250C may output vectors within respective embedding subspaces of further narrower scope (which is not to suggest that such an embedding subspace is smaller, but rather that it accounts for fewer channels of sensor layer 240 input).

Some embodiments may include multiple observable input signals from sensors or other feedback channels of a sensor layer 240 of a dynamic mechanical system, like a robot system, and representing the different channels of data from these sensors in an embedding vector is expected to produce a robust abstraction of the state of the system and the surrounding environment. For instance, some embodiments of a sensor layer 240 of a robot system may provide both servo position data and tactile information, like in the form of pressure or contact readings from fingertip sensors, like in a matrix of force readings corresponding to a grid of sensors on each of a plurality of different end effectors, proximity sensor readings, among various computer vision outputs from one or more cameras, LiDAR units, and the like which may include information about the environment and position of components of the robot within the environment. These signals may be included in the input training data for an embedding model (or encoder model, e.g., of an encoder). For instance, input to a given encoder 250 for a representation of a time slice of sensor data in a feedback loop for controlling a robot system may include a plurality of different channels of sensor data, some of which may correspond to different modalities, like different channels that include frames of video (e.g., depth images with color and depth channels) from multiple cameras at different poses, servo current or position data, strain gauge readings, tactile sensor outputs, audio, inertial measurement unit readings (like a three or six axis IMU), satellite navigation signals, and other input modalities captured during the time slice.

In some embodiments, one or more layers of encoder models may be implemented by hardware machine-learning accelerators. For example, a HW ML Layer-1 may include one or more ML accelerators 250A-C that take as input the output of sensors 240A-E from the sensor layer SL240 of a tree topology. In some examples, these ML accelerators 250A-C may be referred to as upstream encoders or upstream accelerators, as they are closest to the sensory feedback elements and furthest away from a general purpose CPU 260 that may execute various other types of control models based on those sensor inputs. The ML accelerators 250A-C may take input from multiple sensors or just one sensor.

In some examples, an intermediate layer, like HW ML Layer-2 may include one or more intermediate ML accelerators 250D-E. Intermediate ML Accelerators, generally, may take input from upstream accelerators (e.g., two or more), but may also take input from a sensor in combination with input from one or more upstream accelerators.

In some examples, such as that illustrated, a downstream encoder, like a HW ML Layer-3 ML Accelerator 250F may take input from one or more intermediate (e.g., Layer-2) accelerators 250D-E prior to providing output to a CPU 260, which may execute one or more control models that may cause the robot to perform an action based on the input it receives from the ML accelerator 250F.

In some embodiments, a ML accelerator may be coupled multiple sensors. For example, ML Accelerator 250A may ingest sensor data from sensors 240A and 240B. The ML accelerator may execute an encoder model that generates a latent-space embedding based on the combined sensor data 240A and 240B. For example, sensor 240A may be a vision sensor and sensor 240B may be a second vision sensor, like a pair of vision sensors that capture overlapping fields of view from different perspectives, like a stereoscopic camera configuration. The ML accelerator 250A may contain an encoder model that intakes the sensor data from vision sensor 240A and vision sensor 240B and determines a latent space representation of input sensor data. For example, the ML accelerator 250 may execute a convolutional neural network or a vision transformer to output a vector indicative of a slice of input data received from sensor 240A and 240B with in the latent space. The output by the ML accelerator 250A may thus be of a lower dimensionality than the output of the vision sensor 240A and the proximity sensor 250A (e.g., alone or in combination). In some cases, dimensionality may be reduced by one or more orders of magnitude (e.g., 10×, 100× or more).

A ML accelerator may be coupled to a single sensor. For example, ML accelerator 250B may execute an encoder model that ingests the sensor data output by a sensor 240B, like an array of touch sensors which reports values, like readouts of strings of touch values, such by row/column corresponding a plurality of touch sensors within the array. The encoder model may be a geometric learning model that outputs a vector indicative of size of touch area, force, and location within the array, like a vector within a latent embedding space which may distinguish between different areas, forces, and locations. Similarly, dimensionality of the output may be reduced relative to the input.

An intermediate ML accelerator, like ML Accelerator 250D, may receive as input the outputs (e.g., respective vectors) of accelerator 250A and accelerator 250B. The respective vectors within their respective latent-spaces (e.g., like respective sub-spaces) may processed by an encoder model of accelerator 250D to determine a vector within a latent-space that combines aspects previously considered individually in both sub-spaces. In some examples, additional dimensionality reduction may be achieved. For example, the output of accelerator 250D may have a dimensionality less than that of the outputs of accelerator 250A and accelerator 250B in combination or greater, in some cases two times or even an order of magnitude or more fewer dimensions.

As shown, vectors within their respective sub-spaces, may be fed through one or more layers of intermediate encoders, with each successive encoder capturing a greater amount of sensor data within its output. A most downstream encoder (or in some cases a control model) may receive two (or more) sub-space embeddings that may be processed to generate a latent-space embedding indicative of state of the robot in an environment based the data collected by the sensor layer 240 without encountering all of the sensor data directly. For example, a first accelerator may encode depth/distance information (e.g., from a LiDAR sensor), a second accelerator may encode object localization/detection data (e.g., from a camera), and a third encoder may combine the depth/distance information with the object localization/detection data without encountering the sensor information directly. In each iteration, a latent-space embedding may correspond to a reduced dimensionality version of what sensors report with minimal loss of underlying information by maintaining relative distances between inputs and outputs (e.g., similar inputs produce similar outputs and dissimilar inputs produce dissimilar outputs).

In another example, a ML accelerator 250B may be coupled to an infrared imaging sensor 240C. The sensor 240C may provide thermal imaging data to an encoder model of the ML accelerator 250B, which may generate a latent-space embedding indicative of temperatures and temperature gradients within a field of view of sensor. The generated latent-space embedding, like a vector, may be of a lower dimensionality than the thermal imaging data, and may be processed as input along with a vector encoding information about video images (e.g., a vector within a latent space determine by ML Accelerator 250A) by ML Accelerator 205D. An encoder model of ML accelerator 250D may take the latent-space embedding generated by ML accelerators 250A and 250B as input and process them to generate latent-space embedding that indicates temperature of objects within an overlapping field of view of the different imaging sensors.

In another example, a ML accelerator 250E may be coupled to one or more ML accelerators of layer HW ML Layer-2 and one or more sensors of a sensor layer 240. For example, ML accelerator 250E may be coupled to ML accelerator 250C and a magnetic sensor 240E, ML accelerator 240C be coupled to a position sensor 240D. An encoder model of ML accelerator 250E may take as input the magnetic sensor data of the magnet sensor 240E and the latent-space embedding output by the ML accelerator 250C to generate a latent-space embedding that represents the strength of a magnetic field as a function of position, where the latent-space embedding generated by ML accelerator 250E may be a smaller dimensionality than the magnetic sensor data, the latent-space embedding output by ML accelerator 250C, or both.

In some embodiments, a ML accelerator 250F, like a most downstream encoder, may be coupled to two or more intermediate encoders (e.g., like a last set of intermediate encoders within a tree topology), such as ML accelerator 250D and ML accelerator 250E. The ML accelerator 250F may be the last ML accelerator in the tree topology 200A. The encoder model of ML accelerator 250F may take the latent-space embeddings generated by ML accelerator 250D and ML accelerator 250E and generate a final latent-space embedding that is a representation of system and environment state based on the combination of sensed properties reported by the sensors within the sensor layer 240. The ML accelerator may then provide the final latent-space embedding to the CPU 260, which may issue one or more instructions to actuators of the robot system based on the latent-space embedding, such as to transition the robot from a current state to a next desired state.

In some embodiments, a sensor layer 240 may include one or more example sensors (e.g., 240A-E, or more) selected from various types of imaging sensors (e.g., LiDAR, video camera, IR camera, etc.), a light sensor, a proximity sensor, a sound sensor, a temperature sensor, an acceleration sensor, an electromagnetic sensor, a radiation sensor, a position sensor, a navigating sensor, a distance sensor, a gyroscopic sensor, a chemical sensor, a force sensor, a contact sensor, a pressure sensor, or an inertial sensor. In some embodiments, the sensors 240A-E may be coupled directly with a special-purpose chip, like a hardware-machine accelerator, for performing encoding of sensor data prior to the sensor data being provided downstream to a higher-level component, such as an intermediate encoder, or downstream encoder (which may determine a final laten-space embedding based on outputs of upstream encoders), or control model of the system determines instructions based on a state of the robot inferred from the sensor data. One or more encoders may be implemented on general purpose processing units rather than ML Accelerators. For example, one or more ML Accelerators depicted within the HW ML Layers 2 or 3 may be alternatively implemented with general purposing processing units executing an encoder model without departing from the principles of the disclosure. Moreover, one or more ML Accelerators depicted within the HW ML Layer 1 (e.g., upstream encoders) may be alternatively implemented with general purposing processing units executing an encoder model without departing from the principles of the disclosure.

In some embodiments, the encoder models associated with the ML accelerators 250A-F of a robot system 102A may be initialized and trained using sensor data of another robot system (e.g., robot system 102B) or on latent-space embeddings output from ML accelerators associated with the robot system 102B. For example, a robot system 102B may be instructed to perform a task based on a latent space embedding provided to the CPU 260 of the robot system 102B. The robot system 102B may succeed in performing the task. The encoder models of a robot system 102A may receive a set of parameters that are associated with the encoder models associated with the ML accelerators of the robot system 102B. The set of parameters provided to the robot system 102A may then be used to train the encoder model of the ML accelerators 250A-F of the robot system 102A. If robot system 102B has a first sensor type (e.g., a position sensor) and the first sensor type provides data to an encoder model of a ML accelerator coupled to the first sensor type, the parameters of the encoder model that are used to produce a latent-space embedding of the first sensor type data may be used to initialize an encoder model ML accelerator 250A if the sensor 250A coupled to the ML accelerator 250A is the same type of sensor as the first sensor type (e.g., a position sensor).

In some embodiments, the parameters of robot system 102B provided to the encoder models of the ML accelerators 250A-F of robot system 102A may cause the encoder models to search for parameters in a parameter subspace that is smaller than the space of all possible parameters for the encoder models. For example, the encoder model of ML accelerator 250A may use a machine learning model to determine a latent-space embedding that represents sensor data 240A. The machine learning model may take in a large number of inputs (e.g. 1000, 100,000, or 1,000,000) and attempt to determine weights associated with each input. Using the parameters provided by the robot system 102B may cause the one or more machine learning models associated with ML accelerator 250A to use a subspace of the parameters, causing for the possible values of weights to be reduced, and thus the training of the one or more machine learning models for ML accelerator 250A may be simplified and done in a significantly shorter time. The parameters of the robot system 102B may be singular values, or the parameters may be ranges of values.

In some embodiments, a ML accelerator may implement an anomaly detection model. In some examples, one or more anomaly detection models may be implemented by ML accelerators closer to sensory feedback sources, such as within an intermate layer among one or more other ML accelerators implementing encoding models. In some examples, a ML accelerator implementing an anomaly detection model may be implemented in parallel to an encoder model. The anomaly detection model may output stopping conditions on a separate feedback loop to halt actuation or actuate one or more of a subset of components with increased response time relative to a downstream control model. In some example, such an anomaly detection model implemented by an intermediate ML Accelerator may receive vector representations from an encoder model of a ML accelerator (e.g., 250A) of robot system 102A and determine whether a received vector representation is anomalous or not (e.g., meets or exceeds anomalous classification criteria). For example, the anomaly detection model may train on labels associated with outputs from the ML accelerator 250A. A robot system 102A may contain a rotary sensor attached to a joint of a robot arm. The robot system 102A may have attempted to complete a task and failed, where the task may have been to rotate a robot arm about a joint in order to close a door. The anomaly detection model may train on a vectors output by ML Accelerator 250A during attempt of the task, with one or more being labeled anomalous, such as due to binding at the joint caused by motion of the robot arm about a joint that resulted in failure to complete the task (and could possibly result in damage to the joint). After the anomaly detection has been updated, it may be provided with a vector representation of the sensor data of sensor 240A and 240B as output by ML Accelerator 250A, such as to detect a condition based on sensor 240A and 240B data that corresponds to an anomalous condition of rotation about the joint (e.g., such as based on a combination of strain gauge and position sensor data).

An encoder operating in accordance with the above principles may encode more (or more detailed) information about system or environment state by minimizing the amount of data omitted during an encoding phase. In turn, downstream models operating on the vectors output by the encoder (e.g., at an increased rate, or that include richer content) may improve inferences made by downstream models. Encoder models may be stand-alone models or, in some cases, a training process may implement end-to-end learning, in which a model that both transforms inputs to an embedding vector and determines responsive actions is trained in a global optimization. Or in some cases, different stages in a pipeline of such models may be separately trained, with different optimizations of different sets of model parameters occurring at different times, possibly on different training sets.

In some examples, outputs from multiple data channels (whether output by different sensor or different encoders) may be obtained and processed to generate a training data set, which may be included as input training data for an encoder model (e.g., like an embedding model of an encoder). For example, during performance (or attempt at performance) of an action by a robot system, streams of data values from a plurality of data channels ingested by an encoder may be recorded. In some examples, some or all of the data may be labeled, such as based on whether the robot system completed an action (or step), failed an action (or step), or encountered a stop condition. In some examples, streams corresponding to different steps may be generated, such as for each step (or phase) of an action.

Figure 2B:
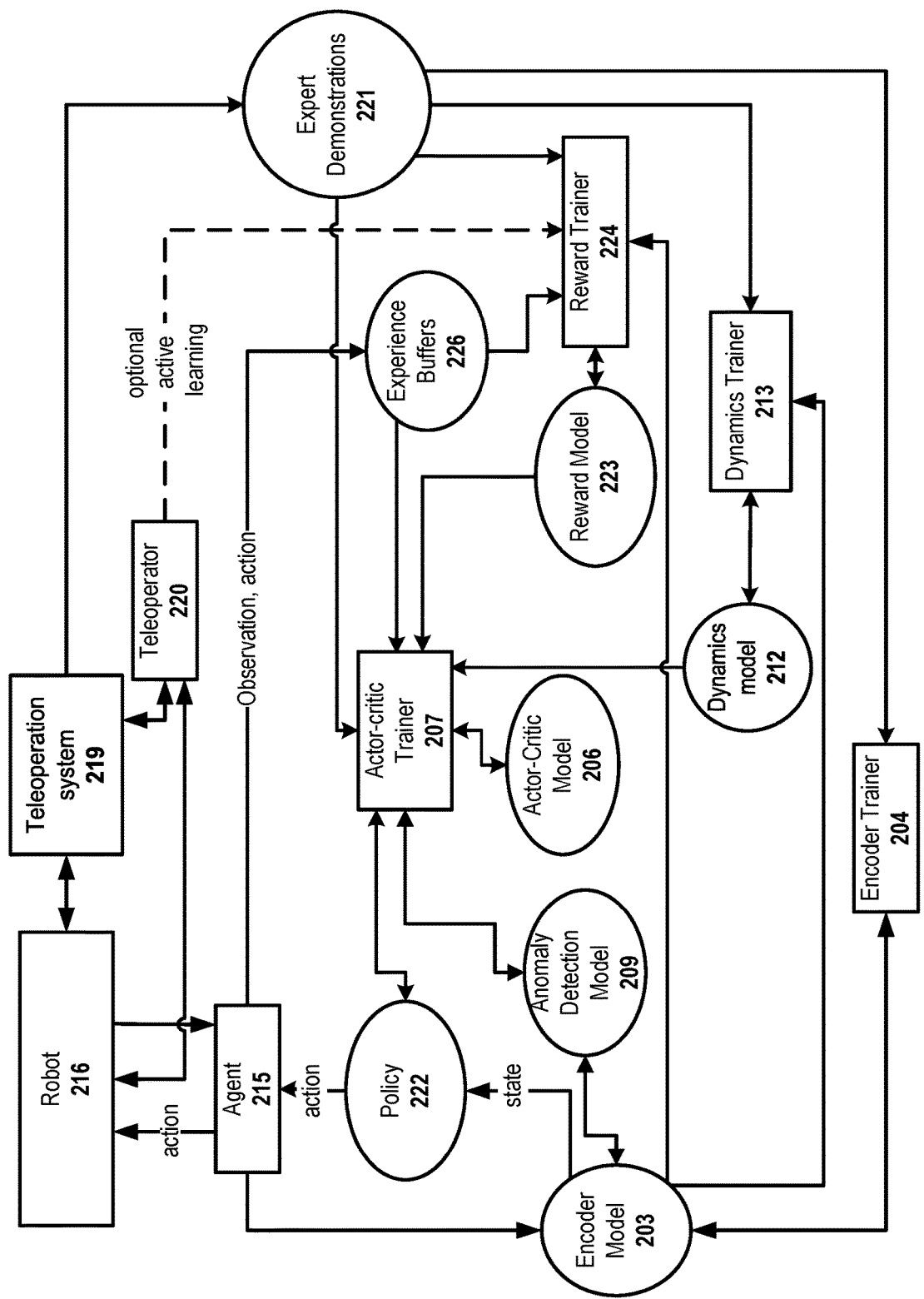
FIG. 2B illustrates an example machine learning architecture and training environment 200B of a robotic system within which a hybrid computing architecture may be incorporated, in accordance with some example embodiments.

FIG. 2B shows an example machine learning architecture and training environment 200B of a robotic system within which a hybrid computing architecture may be incorporated, in accordance with some example embodiments. Example functionality, components, or models shown in FIG. 2B may be implemented or supported by one or more entities within the environment 100 of FIG. 1. Different embodiments may distribute functionality or components among entities described herein in different ways, e.g., training or control may be both or individually remote or distributed relative to a fleet of robots, which may itself be distributed among various geolocations connected by communication networks.

The example environment 200B, such as of a robot system, may include a robot 216. The robot 216 may include all or some of the components of an example robot system 102 as discussed with reference to FIG. 1. Examples of a robot 216 may include, but are not limited to: an anthropomorphic robot (e.g., with legs, arms, hands, or other parts), a non-anthropomorphic robot (but which may include one or more components to interact with objects (e.g., with suction, magnetism, pincers, electrically, etc.) or its environment (e.g., thrusters, jets, propellers, etc.) in humanlike or non-humanlike ways), an articulated robot (e.g., an arm having two, six, or ten degrees of freedom, etc.), a cartesian robot (e.g., rectilinear or gantry robots, robots having three prismatic joints, etc.), Selective Compliance Assembly Robot Arm (SCARA) robots (e.g., with a donut shaped work envelope, with two parallel joints that provide compliance in one selected plane, with rotary shafts positioned vertically, with an end effector attached to an arm, etc.), delta robots (e.g., parallel link robots with parallel joint linkages connected with a common base, having direct control of each joint over the end effector, which may be used for pick-and-place or product transfer applications, etc.), polar robots (e.g., with a twisting joint connecting the arm with the base and a combination of two rotary joints and one linear joint connecting the links, having a centrally pivoting shaft and an extendable rotating arm, spherical robots, etc.), cylindrical robots (e.g., with at least one rotary joint at the base and at least one prismatic joint connecting the links, with a pivoting shaft and extendable arm that moves vertically and by sliding, with a cylindrical configuration that offers vertical and horizontal linear movement along with rotary movement about the vertical axis, etc.), a self-driving car (or other vehicle, like a truck, a drone or boat), a household appliance, construction or manufacturing equipment, or a variety of other types of robots. The robot 216 may include the robot in, or one or more cameras, joints, servomotors, stepper motors, pneumatic actuators, or any other component discussed in, U.S. patent application Ser. No. 16/918,999, filed 1 Jul. 2020, titled "Artificial Intelligence-Actuated Robot," the entire contents of which are hereby incorporated by reference.

In some example embodiments, one or more of the components of the environment 200 may implement aspects of a reinforcement learning process, which may include deep reinforcement learning techniques, to control aspects of robot operations. In some examples, an agent 215 may send the robot 216 one or more actions determined based on a policy 222. The policy 222 may take, as input, a current state of the robot and return an action to perform (e.g., to cause the robot to transition from the current state to a next state). The action returned by (or based on) the policy 222 may maximize a reward, or rewards (e.g., cumulative), over time (e.g., such as to complete a task). In some cases, a reward for a given current action may be negative (or suboptimal) relative to other possible rewards for other actions but selected by the policy 222 to maximize cumulative rewards.

Results of an action performed by the robot 216 within its environment may cause changes in various sensor readings or otherwise yield sensor feedback data, which may be analyzed to determine a (new) current state by which another action for the robot may be determined based on policy 222. For example, an encoder model, which in some examples may be a trained encoder model 203, may generate a vector representation of the state of the robot and its environment based on data obtained from sensors of the robot 216. Sensor data, like feedback data, collected by the robot 216 may be passed via the agent 215 to the encoder model 203, such as in a feedback loop, by which the encoder model 203 may output (e.g., update) a current state of the robot (e.g., which may be continuously updated, such as at a given frequency, based on obtained sensor data). For example, the encoder model 203 may generate a (e.g., current) vector representation (e.g., a latent space embedding) based on obtained feedback data from the sensors that indicates the current state of the robot. Then, the encoder model 203 may obtain (e.g., updated) feedback data from the sensors (e.g., as a result of an action performed by the robot) and generate a (e.g., new) vector representation (e.g., a new latent space embedding) based on the updated feedback data from the sensors that indicates the new (e.g., now current) state of the robot. The policy 222 may then determine whether the new state of the robot corresponds to the next (e.g., desired) state (e.g., based on the vector representation) and whether to output another action based on the result. In some embodiments, an encoder model 203 may be trained via an encoder trainer 204 based on latent space embeddings (e.g., of vectors indicative of robot state) within a latent embedding space. A latent space embedding may reduce the dimensionality of data received from sensors, such as to facilitate efficient processing of robot state by other models. For example, if the robot has multiple color 1080p cameras, touch sensors, motor sensors, or a variety of other sensors, then input to an encoder model for a given state of the robot (e.g., output from the sensors for a given time slice) may be tens of millions of dimensions. The encoder model may reduce the sensor data to a vector in a latent space embedding (e.g., a space between 10 and 2000 dimensions in some embodiments). Distance between a first space embedding (e.g., which may correspond to an initial state) and a second space embedding (e.g., which may correspond to a current state) may preserve the relative dissimilarity between the state of a robot associated with the first space embedding and the state of a robot (which may be the same or a different robot) associated with the second space embedding.

Various example encoder architectures discussed within reference to FIG. 2A may, for example, be implemented within the context of FIG. 2B. For example, encoder model 203 may be representative of a collection of encoder models.

The collection of encoder models may include various hardware machine-learning accelerators or general purpose processors implementing a hierarchy of encoder models. As an example, encoder model 203 may correspond to a downstream encoder (e.g., 250F in FIG. 2A) which outputs a latent space representation indicative of properties sensed by sensors of a sensor layer (e.g., 240 in FIG. 2A) which may be pre-processed into vector representations within subspace embeddings by one or more upstream encoders which, in some examples, may be implemented by hardware machine-learning accelerators.

In some embodiments, an anomaly detection model 209 may receive vector representations from an encoder (or encoder model) 203 and determine whether a received vector representation is anomalous or not (e.g., meets or exceeds anomalous classification criteria). Although only one encoder 203 is shown, embodiments may include multiple encoders or encoder models (e.g., for processing feedback data from different sensors or collections of sensors or other encoders). For example, a first encoder may send latent space embeddings to the anomaly detection model 209 and a second encoder may send latent space embeddings to the first encoder model or other components of the system 200B.

In some embodiments, a dynamics model 212 may predict a next state given a current state and action that will be performed in the current state (e.g., to cause the robot to transition to the next state). The dynamics model 213 may be trained by the dynamics trainer 213 based on training data collected in association with input instructions during training demonstrations (e.g., inputs provided by a teleoperator, such as via a user device) or otherwise based on performance of the robot system at completing a task (e.g., during training or over the course of its operation). Predictions output by the dynamics model 212 may include a predicted trajectory from a current state (e.g., towards a next state) based on the current state and action to be performed by the robot. Many possible trajectories may exist from one state to another state, but some (or even most) may result in failure of a task (e.g., spilling the contents of a container). Thus, for example, a correct trajectory may account for coordinated actions of various components of the robot to reach a next state without failing a task, and among those correct trajectories, some may be more optimal than others. A trained dynamics model 212 may predict whether an action is indicative of a deviation from a correct (or optimal) trajectory. For example, the dynamics model 212 may determine whether an action corresponds to a predicted trajectory having one or more parameters that exceed (e.g., turning too fast, lifting a container without maintaining its orientation relative to gravity, moving one component but not another, and spilling the contents) or otherwise deviate from parameter values of a correct (or optimal) trajectory that yield to a successful transition between states (e.g., based on classification of successful and unsuccessful transitions included in training data processed by the dynamics trainer 213 to train the dynamics model 212).

In some embodiments, an actor-critic model 206 may determine actions for a robot 216 to perform based on policy 222. An example of an actor-critic model 206 may be implemented as a (or component of a) reinforcement learning model. An actor-critic trainer 207 may train the actor-critic model 206 based on training data collected in association with performed actions, changes in state resulting from the actions, or rewards associated with states or changes in states, among other data (e.g., whether an action corresponded to movement along a correct (or optimal) trajectory). The actor-critic model 206 may adjust the policy 222 to indicate what actions are permitted or are to be performed given certain criteria (e.g., an input state and a desired next state, associated rewards, among other data, such as whether a container is empty or full).

In some embodiments, a reward model 223 may take as input a state of the robot 216 (e.g., the state may be generated by the encoder model 203) (and optionally other input indicative of how the robot 216 reached the state) and output a reward. For example, the reward model 223 may output a reward to the robot 216 (e.g., via indication of a reward to one or more other components) for reaching a state corresponding to completion of a task or one or more states corresponding to progress towards completing a task. The output from the reward model 223 may be received by the various trainers (or the models) to classify whether one or more determinations produced a reward, whether the reward was positive or negative, or magnitude associated with the reward. For example, rewards received by the actor-critic trainer 207 and actor-critic model 206 may improve ability of the model 206 to determine whether an action or sequence of actions lead to (or will lead to) the completion of a task assigned to the robot 216 to maximize reward. The reward trainer 224 may train the reward model 223 based on indications of success (or failure) received via a teleoperation system 219 or via sampling of data stored in the experience buffers 226 (e.g., to determine an indication of success or failure based on internal or external feedback or other criteria, such as detection of whether a container was dropped based on sensor feedback data, or external feedback indicating whether a weight of container remained within a threshold between two weigh stations to indicate whether contents were lost or new contents the robot 216 was intended to receive into the container were not collected). In some embodiments, the system 200B may adjust a weight or bias of the reinforcement learning model, such as a deep reinforcement learning model, in response to determining that a latent space embedding (e.g., generated by the encoder model 203) corresponds to a desired or undesired state. In turn, other models of the system may receive rewards corresponding to their performance of reaching desired states and avoiding undesired states by their actions that cause the robot to transition between states to accomplish a task (and those models too may update their weights or biases based on their performance as indicated by received rewards). Thus, adjusting a weight of the reinforcement model may reduce a likelihood of the robot of performing an action that leads to an anomalous state.

In some embodiments, an experience buffer 226 may store data corresponding to operations of the robot 216. For example, one or more experience buffers 226 may store data such as current state information, an action determined based on the current state, feedback data collected in association with performing the action, resulting state information, or other observational or external feedback data during operation of the robot. Data stored within an experience buffer 226 may include data generated based on training instructions, like commands instructing the robot to perform one or more actions. For example, a teleoperation system 219 may be used by a teleoperator 220 to provide instructions (e.g., via a user device) to control the robot 216. In some embodiments, a teleoperation system 219 may record demonstrations of the robot performing a task (e.g., based on operator input controls), which may be associated with or included in data stored within an experience buffer 226. Stored data may include sequences of observations, like sensor feedback data, generated via the robot 216 (e.g., cameras, touch sensors, sensors in servomechanisms, or other parts of the robot 216 among other feedback) during a demonstration, and an indication of whether the given demonstration was successful (or not, or other result). Data stored within the experience buffers 226 (or by other components of the system 200B) may be associated with received or determined indications of success or failure at a task or progress towards completing a task to generate training data (or sets of training data, like a training set and a validation set) for machine learning models.

A machine learning model may be trained (e.g., iteratively, by adjusting values, like weights, of a parameter set of the machine learning model) based on training data to determine values of model parameters that maximize indications of successes (e.g., rewards) and minimize indications of failure in model outputs that are generated based on inputs to the model and values of model parameters. In some examples, one or more models, like the above-described models, may be trained based on training data including outputs generated by other models, sensor feedback data or other feedback, and classifications (e.g., indications of success or failure), at least some of which may be stored within one or more experience buffers 226 and may include, or later be augmented with other data or classifications (e.g., based on analysis of stored or merging of external feedback or indications of success or failure). For example, the data may be used to determine rewards (e.g., for operations that correspond to indications of success) and train the reward model 223.

Additionally, or alternatively, the data stored by the experience buffers 226 may be used by the actor-critic trainer to train the actor-critic model 206 to determine actions for the robot 216 to perform. Some models may be trained based on the outputs of other models. For example, the actor-critic model 206 and the encoder model 203 may be trained based on outputs generated by each other or other models. For example, a trainer may adjust a given weight of the encoder model 203 based on an action determined by a reinforcement learning model (e.g., the actor-critic model 206).

Additionally, or alternatively, a trainer (which may be a different trainer, or the same) may adjust a given weight or bias of a reinforcement learning model (e.g., like an actor-critic model 206), such as a deep reinforcement learning model, based on the state (e.g., a latent space embedding) generated via the encoder model 203 based on the feedback data received from sensors of the robot. In another example, a trainer may adjust a weight of the reinforcement learning model (e.g., the actor-critic model 206) in response to determining that a latent space embedding (e.g., generated by the encoder model 203) corresponds to an anomaly (e.g., failure state or other undesirable condition). An example trainer may determine an adjustment to a weight of the reinforcement model that, e.g., is predicted, or determined based on trial and error or other feedback data, to reduce a likelihood of model outputs to cause the robot to perform an action that leads to that anomalous state (among others). Example machine learning models may be trained by a ML subsystem (e.g., which may include one or more trainers) of a robot or a server or both.

As an example, described with respect to FIG. 3, a machine learning model 302 may take one or more inputs and generate one or more outputs. Examples of a machine learning model 302 may include a neural network or other machine learning model described herein, may take inputs 304 (e.g., input data that described above) and provide outputs 306 (e.g., output data like that described above) based on the inputs and parameter values of the model. For example, the model 302 may be fed an input or set of inputs 304 for processing based on a state, sensor data, action, instructions for an action, or other data, and provide an output or set of outputs 306. In some cases, outputs 306 may be fed back to machine learning model 302 as input to train machine learning model 302 (e.g., alone or in conjunction with indications of the performance of outputs 306, thresholds associated with the inputs, or with other feedback information). In another use case, machine learning model 302 may update its configurations (e.g., weights, biases, or other parameters) based on its assessment of a prediction or instructions (e.g., outputs 306) against feedback information (e.g., sensor data, state labels, like anomalous, indications of the performance or with other feedback information). In another use case, such as where machine learning model 302 is a neural network, connection weights may be adjusted to reconcile differences between the neural network's prediction or instructions and the feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 302 may be trained to generate better predictions or instructions.

In some embodiments, the machine learning model 302 may include an artificial neural network. In such embodiments, machine learning model 302 may include an input layer and one or more hidden layers. Each neural unit of the machine learning model may be connected with one or more other neural units of the machine learning model 302. Such connections can be enforcing or inhibitory in their effect on the activation state of connected neural units. Each individual neural unit may have a summation function which combines the values of one or more of its inputs together. Each connection (or the neural unit itself) may have a threshold function that a signal must surpass before it propagates to other neural units. The machine learning model 302 may be self-learning or trained, rather than explicitly programmed, and may perform significantly better in certain areas of problem solving, as compared to computer programs that do not use machine learning. During training, an output layer of the machine learning model 302 may correspond to a classification, and an input known to correspond to that classification may be input into an input layer of machine learning model during training. During testing, an input without a known classification may be input into the input layer, and a determined classification may be output. In some examples, a classification may be an indication of whether an action is predicted to cause a robot to transition from a current state to a target state along a desired trajectory. Some example machine learning models may include one or more embedding layers at which information or data (e.g., any data or information discussed herein in connection with example models) is converted into one or more vector representations. The one or more vector representations of the message may be pooled at one or more subsequent layers to convert the one or more vector representations into a single vector representation.

For example, an encoder may generate a latent space embedding (e.g., a vector representation with reduced dimensionality relative to a vector including obtained feedback data across different modalities for a time slice) based on sensor or other feedback data indicative of state of the robot or the environment around the robot periodically (e.g., 30 times per second or more, 10 times per second, every two seconds, etc.). A latent space embedding may indicate a current position or state of the robot (e.g., the state of the robot after performing an action to turn a door handle). As noted above, a latent space embedding may reduce the dimensionality of data received from sensors. For example, if the robot has multiple color 1080p cameras, touch sensors, motor sensors, or a variety of other sensors, then input to an encoder model for a given state of the robot (e.g., output from the sensors for a given time slice) may be tens of millions of dimensions. The encoder model may reduce the sensor data (e.g., having potentially many orders of magnitude more dimensions than 2000) to a latent space embedding in a latent embedding space to facilitate training of downstream models on a reduced number of factors (e.g., like a filter).

In some cases, a machine learning model 302, like a convolutional neural network (CNN) or other machine model like a TCE or TCN model (or combination thereof), trained with deep metric learning, may be trained to transform (e.g., encode) high-dimensionality inputs into vectors, like reduced dimensionality vectors, that characterize properties of the high-dimensionality inputs with reduced dimensionality (e.g., one or more orders of magnitude fewer dimensions). Additionally, and especially in the case of TCE and TCN models, the machine learning model 302 may be trained to recognize a notion of time as an additional dimensionality, such as by training on temporal sequences of training records. Temporality may be conveyed by forming pairs, triples, or tuples of records (or segments, or records within segments) in sequence, as they might occur in time, in the training data. Example models may be trained by iteratively adjusting model parameters, like weights and biases of perceptrons (e.g., neural units in a neural network), to locally optimize an objective function on a training set.

For example, parameters may be adjusted in directions that, according to partial derivatives of the parameters with respect to the objective function, locally optimize the objective function, e.g., increase fitness of a fitness function or decrease loss of a loss function when the current instantiation of the model is applied to the training set. The objective function may be configured to favor resulting embedding vectors that place dissimilar inputs far apart and similar inputs close together in the space. Objective functions may be based on similarity between, for instance, pairs of records (or segments, or records within segments) in a training set, or triplets, or tuples of larger sets which may be ordered in temporal sequence. Model parameters may be iteratively adjusted in this manner until a stopping condition is detected, e.g., more than threshold number of iterations have occurred, or less than a threshold amount of change in the objective function occurs between iterations, indicating a local minimum or maximum. In some cases, different distance metrics may be learned for different portions of the distribution of possible inputs.

Various types of objective functions may be used to train a model. Examples include contrastive loss functions, triplet loss, lifted structure loss functions, n-pair loss functions, angular loss functions, divergence loss functions, and the like. Distances in the embedding space, both during training and during inference, may be computed with a variety of measures, including cosine distance, Euclidian distance, Manhattan distance, Hamming distance, and Minkowski distance. In some embodiments, metric learning is used in order to help learn an effective distance measure by which an embedding model (whether a TCE or TCN model, or other model) may output data, like embedding vectors, that distinguish between different input conditions for time slices to which they correspond (and minimally distinguish between similar input conditions) within an embedding space (whether a subspace or latent embedding space). Metric learning may include learning a measure of distance, like weights or biases of a function, that satisfies training objectives of a model for an encoder.

Many approaches in machine learning use a measure of distance between data points. Traditional approaches with existing knowledge of a domain may employ a standard distance metric (Euclidean, Cosine, etc.). However, it is often the case that a distance metric is not well-suited to a particular data set or domain. In other words, a standard distance metric, like a Euclidean distance, may poorly characterize similarity between similar states or dissimilarity to other states. For example, two different states in which a robot system may grasp an object resting on a table may appear objectively similar to a human observer but may be dissimilar in parameter space using a standard distance metric. As an example, a first state may correspond to a robot positioned near a table and with an end effector retracted and a second state may correspond to a robot positioned farther away from the table and with an end effector extended. The difference in values corresponding to the retracted/extended position of the end effector may cause a discrepancy between recognition of the states as similar (e.g., in either instance the robot may be capable of grasping an object positioned on the table). In many cases, it is desirable for the robot to recognize this similarity. Distance metric learning, or metric learning, may be performed to construct a distance metric that detects a similarity between two states that might otherwise be represented as dissimilar by some other distance metric. The learned distance metric can then be used to perform operations like classification, clustering, etc. and iteratively train a model with an objective function based on the learned distance metric. For example, a process may select parameters of a distance function that optimize output of an objective function that measures agreement of a model with training data. Some examples may use a Mahalanobis distance, which is a Euclidean distance after a transformation, like a linear transformation, of the feature space defined by a matrix of parameter values (e.g., of features). A Mahalanobis distance metric learns a new embedding space of some number of dimensions, which may be reduced relative to the number of features, to reduce dimensionality of the embedding space.

Architecture of a machine learning model 302 may take a variety of forms. Some embodiments include a plurality of convolution layers that apply a learned kernel to a sliding window over inputs. A kernel, like a matrix, may extract certain features from inputs by multiplication against the input to increase the prominence of the features in the outputs. In some cases, depth separable convolutions may be used to reduce the amount of computing resources needed to attain acceptable latency with available hardware. In some cases, pooling layers may follow convolutional layers in the neural network to reduce dimensionality of the output of the convolutional layers, e.g., max pooling layers, average pooling layers, or global pooling layers, which may make the resulting model more to robust to variation in translation of objects and may reduce the amount of computing resources used. Some embodiments may include a rectified linear activation function as part of the convolution operation performed by the convolutional layers, before pooling. Some embodiments may include a final flat layer of a neural network (or final layer of a segment of a larger neural network, like in an end-to-end learning model used for both representing inputs and exercising control) in which each output corresponds to a different dimension of the embedding space. Example models may be supervised to various degrees. For example, in some cases, a machine learning model 302 may be a supervised learning model in which labels are applied to inputs indicative of the salient aspects of the state they depict.

In some embodiments, a self-supervised approach may be used. For example, where video is concurrently captured from different camera poses with overlapping fields of view (e.g., with a stereoscopic camera array or a light field sensor), embodiments may implement a time-contrastive network (TCN) that applies self-supervised learning, like that described in Sermanet et al, *Time-Contrastive Networks: Self-Supervised Learning from Video*, arXiv: 1704.06888v3, 20 Mar. 2018, the contents of which are hereby incorporated by reference. In some examples, the training records including different camera poses may include other data, such data channels for multiple other modalities. In some examples, one or more of the different cameras, which may also correspond to different modalities, may capture different aspects of an image, for example a camera may perform thermal or IR imaging, while another camera may be a high speed camera that captures at a high frame rate (but in many cases at reduced resolution), and another camera may capture at a high resolution (e.g., 1080, 4k or more). Some embodiments may ingest unlabeled sequences of video frames of the overlapping fields of view from different perspectives, and some embodiments may apply an objective function during training that favors (e.g., produces an output of the objective function that is more optimal than less favored results during training) close proximity (e.g., below a threshold distance) of embedding vectors of video frames captured concurrently from different perspectives on the same scene. The ingested sequences may be segmented as described herein, such as segmented for each channel, and the channel segments corresponding to matching positions along a temporal sequence may be selected to a segment record. Accordingly, the model may train on segment records including one or more frames from each camera channel that occurred proximate to each other in time and the segment records may be temporally ordered. Thus, for example, the trained model may determine position of input data (across one or more of the modalities) within a temporal sequence. Certain TCN embeddings (and other embeddings) may implement relatively efficient encodings of purely visual input, but often they do not include any other input modality (which is not to suggest that such approaches or any other subject matter is disclaimed). Accordingly, in some cases, a TCN model may be pipelined with another model to combine these features, or pipelined with another encoder that may combine TCN output (e.g., one or more cameras, which may include multiple image input modalities) with other channel data. Or, in some cases, a TCN may be implemented within one or more layers of a neutral network to efficiently encode video channels and other layers may encode other channels of input from other sensors. In either case, output cannels of different modalities, whether at the sensor output level, or encoder output level (e.g., received by a downstream encoder), may be encoded in connection with each other as a representation of input state.

Other examples of self-supervised models, like a TCE model, that may be used include those described by Knights et al, *Temporally Coherent Embeddings for Self-Supervised Video Representation Learning*, arXiv:2004.02753v5, 17 Nov. 2020, the contents of which are hereby incorporated by reference. Some embodiments may implement the approach described by Dwibedi et al, *Temporal Cycle-Consistency Learning*, arXiv:1904.07846, 16 Apr. 2019, the contents of which are hereby incorporated by reference. In some embodiments, the objective function may also be configured to drive apart embedding vectors of the same scene at different times or different portions of a planned path of a dynamic mechanical system being controlled, thereby potentially forcing the model to capture information in the embedding vector that is relevant to operation of the dynamic mechanical system.

After training, the resulting model (with the adjusted parameters) may be used to compute embedding vectors on out-of-training-set inputs, often in real time during operation of the dynamic mechanical system, as new frames of video are received. As described herein, image channel data (e.g., from one or more cameras) may be combined with channel data from other input modalities, like other sensors. Thus, for example, characteristics of robot pose within an environment and characteristics of the environmental may be captured and indicative of position along a temporal sequence, which in an embedding space, may encode other aspects of robot state based on channel data received from other sensors, like a matrix of force sensors, strain gauges, stepper motor positions, and the like. Accordingly, a process controlling the dynamic mechanical system may then use those vectors to determine which commands to issue to actuators in the system to attain a desired state, e.g., by detecting that a current state indicates a deviation from a planned path and adjusting a set point of an actuator to reduce or eliminate the deviation. A temporal sequence along which inputs are characterized by a vector in the embedding space may indicate a sequence of successive target states along such a planned path that may correspond to successful completion of a task as indicated by training data in association with records, like segment records, for which ingested channel data were characterized along the temporal sequence in the embedding space.

Example embodiments may implement one or more of the above noted models, and especially those relevant to encoding outputs of one or more sensors (and resulting encoded outputs) with one or more hardware machine-learning accelerators as described herein (e.g., with reference to FIG. 2A). For example, embodiments may implement a hybrid computing architecture using one or more specialized hardware machine-learning processors to handle some or all of encoding or decoding of space (e.g., latent space or sub-space) representations and one or more general purpose processors (e.g., CPUs) to execute higher level control models. In some cases, these hardware machine-learning accelerators are implemented with application-specific integrated circuits that hardcode the machine learning algorithms, or supporting operations, like linear algebra operations (such as basic linear algebra subprograms, or BLAS, operations, like matrix multiplication and vector-matrix multiplication), into circuitry, which is expected to produce an order of magnitude or more improvement in performance in some cases. In some instances, hardware accelerators may also be implemented with field programmable gate arrays using similar approaches. Improving execution times of models for encoding inputs within an embedding space, like various example models described above, is expected to reduce latency (e.g., by increased resolution of time-slices or by decreasing processing time of time-slices) in robot decision making by expediting determinations of robot state and reducing dimensionally of output indicative of robot state prior to ingestion by one or more control models.

In various example embodiments, such as those describe with reference to FIG. 2A, a hardware machine-learning accelerator may be paired with one or more sensors. In examples embodiments, the accelerator and model it executes may be specific to sensor type or schema of sensor output. For example, compatible accelerator-model pairings, based on model performance on different accelerators may be determined, and model-sensor parings, based on model performance on sensor output data may be determined. Thus, for example, an accelerator-model pair may be matched to a model-sensor pairing. In some cases, further pairings may be determined for intermediate or downstream encoder models based on model performance on upstream encoder outputs. Matching of accelerator-model pairings to model-sensor or model-encoder output pairings may identify selection of model-appropriate accelerators within the context of a pipeline or hierarchy of encoders layered over a sensor suite (e.g., a sensor layer).

Based on the matching, a hardware machine-learning accelerator may be configured to execute operations of a machine learning model upon inputs received from one or more sensors or encoders. For example, some embodiments of robots and other controlled dynamic mechanical systems described herein may include a plurality of sensors of a modular system hardware design such that each sensor (or a grouping of sensors) is coupled (directly, in some examples) with special-purpose chipsets for performing a space (e.g., like a sub-space or latent-space) or other encoding of sensor data prior to downstream digestion by a higher-level component or model of the system. Moreover, one or more intermediate or downstream models, like various models for encoding inputs, may operate on those encoded outputs to combine sub-spaces into broader representations (which is not to suggest that the broader representation need be of higher dimensionality or size, but rather that it accounts for more properties in aggregate that are reported by sensors of the sensor layer). One or more of the upstream, intermediate (or downstream) encoders may be implemented within one or more hardware ML Accelerators like, but not limited to, Movidius chips, tensorflow edge compute devices, Nvidia Drive PX and Jetson TX1/TX2 Module, Intel Nervana processors, Mobileye EyeQ processors, Habana processors, Qualcomm's Cloud AI100 processors and SoC AI engines, IBM's TrueNorth processors, NXP's S32V234 and S32 chips, AWS Inferentia chips, Microsoft Brainwaive chips, Apple's Neural Engine, ARM's Project Trillium based processors, Cerebras's processors, Graphcore processors, PEZY Computing processors, Tenstorrent processors, Blaize processors, Adapteva processors, Mythic processors, Kalray's Massively Parallel Processor Array, BrainChip's spiking neural network processors, Almotiv's neural network acceleration core, Hailo-8 processors, and various neural network processing units from other vendors. Different ones of these ML Accelerators may be used to implement different ones of the aforementioned models upon sensor data (or upstream encoder output data), such as based on matching of model performance on a given accelerator for given sensor output.

In some cases, each sensor is coupled to a hardware machine-learning accelerator, such as a hardware machine-learning accelerator implemented by, with, or within one or more of the above mentioned special-purposed chipsets, that is positioned relatively close to the sensor, like on the same printed circuit board or within 10 or 20 cm. In some examples, a sensor may be coupled to a hardware machine-learning accelerator via a relatively high-performance bus (e.g., a PCI Express 3, 4, or 5 or faster bus) rather than a via a network interface. Output of an accelerator may be conveyed over a local network (e.g., a CAN bus or Ethernet) to a processor that implements control over the dynamic mechanical system, like a CPU connected to outputs of a plurality of such hardware machine-learning accelerators. In some cases, output of one or more accelerators may be conveyed over the local network, or a high-performance bus, to a another machine learning accelerator (or encoder model executed by a general purpose processor). For example, as shown in FIG. 2A, a plurality of ML accelerators may be arranged hierarchically in a tree topology, with upstream ML accelerators receiving raw inputs from sensors and producing outputs that are then taken as input to intermediate level ML accelerators in two or more layers, with some or all intermediate layer ML accelerators receiving inputs from multiple upstream ML accelerators, and a downstream ML accelerator encoding a final latent-space embedding for output to a control model (or multiple higher-level control models, such as one or more of the control models described with reference to FIG. 2B).

In some embodiments, some or all of the operations by which input is transformed into an output of a machine learning model, such as in inference indicating state of the dynamic system and its environment, are performed by hardware machine-learning accelerators. Or in some embodiments, a deep neural network (for instance having more than 10 layers) may be implemented with upstream layers performed by the hardware machine-learning accelerators and downstream layers implemented in a more centralized process, either another intermediate layer hardware machine-learning accelerator or a CPU or other general-purpose computing hardware. In some cases, this arrangement is expected to afford flexibility while still benefiting from the performance advantages of hardware machine-learning accelerators. For example, upstream hardware machine-learning accelerators may infer lower-level features of inputs, like edges, corners, shapes, or locations of objects indicated by sensor data, like frames of video. And these features may then be ingested by downstream processors that then infer more complex aspects of state of the system, like a location of a vector in an and embedding space in which state of the dynamic mechanical system and its environment is represented. Training may implement end-to-end learning, active learning, or transfer learning in the described segments of the processing pipeline.

In some embodiments, the hardware machine-learning accelerators may execute a trained deep neural network implementing an autoencoder that transforms relatively high dimensional data, like video and other sensor data (e.g., motor currents, position encoders, depth images, 3 or 6 axis IMU readings, tactile sensor outputs, or the like) into a lower dimensional representation, like a vector in an embedding space. In some embodiments, the vector may have a dimensionality that is less than $1/10$th, $1/100$th, $1/1000$th, or $1/10,000$th the dimensionality of the output of the sensor. In some embodiments, the autoencoder may produce an output vector that is then taken as an input to a downstream autoencoder that receives similar outputs from a plurality of other hardware machine-learning accelerators that are closer to other sensors in a processing pipeline. That downstream hardware accelerator may then transform those vectors in different embedding spaces into an aggregate representation in yet another embedding space with an autoencoder executed by the downstream processors.

In some cases, transfer learning may be used to configure hardware accelerators that are in this pipeline, particularly those closer to the sensors. It is expected that lower-level features in an inference pipeline will be more invariant among use cases while higher level features are expected to vary more depending upon the task at hand. As such, a hybrid architecture like that described is expected to be particularly well-suited for implementation on hardware machine-learning accelerators that trade-off some flexibility for higher performance.

In some embodiments, the hardware accelerators may have a relatively high number of processing units configured to operate concurrently, like a relatively large number of cores or arithmetic logic units. For example, the hardware accelerators may have more than 100, more than 1000, or more than 5000 cores configured to concurrently process data, for example, by concurrently computing outputs of perceptrons in a neural network based upon inputs and weights and biases of those perceptrons learned during prior training operations.

In some embodiments, the hardware accelerators may be configured with relatively low precision integer encoding, for example, less than 16 bits, 8 bits, 4 bits, or 2 bits of data representing units of information upon which the processors operate. In some embodiments, the lower integer depth may reduce the amount of surface area of a chip consumed by each core, thereby making room for more cores and trading off precision for concurrency, which is expected to produce favorable trade-offs in the domain of machine learning. In some embodiments, particular integer formats may be used to capture a wider range of information than that afforded by simpler uses of a given number of bits of information, for instance, with bfloat16 or other floating-point radix formats that are again expected to provide beneficial trade-offs well calibrated to various machine learning models useful for controlling dynamic mechanical systems.

In some embodiments, memory access may be optimized in the hardware accelerators for machine learning use cases, for example, with relatively large on die cache (e.g., capable of storing an entire model in physical cache memory), or with cores integrated with the memory storing the model parameters and inputs upon which they operate, like in a memcompute architecture or a neuromorphic architecture. In some embodiments, each core may have a dedicated memory bus to access different units of memory or shared unitive memory with relatively low latency.

In some embodiments, the arrangement of hardware machine-learning accelerators may be configured based on arrangements of suits of sensors. For example, an array of cameras, like a stereoscopic pair (or set of 3, 5, 7 or more) of cameras may each have an associate hardware machine-learning accelerator that performs, for example, one or more convolutional layers or one or more pooling layers therebetween in a neural network and output of these two hardware machine-learning accelerators may then be merged into yet another hardware machine-learning accelerator that infers depth related features or vectors in an embedding spaces that encode information about depth. In some embodiments, these architectures may be implemented with depth-separable convolutions to reduce memory and processing intensive operations involved in merging convolutional channels until later in a pipeline using techniques like those implemented in mMobileNet V3, for example.

Other models, like a downstream control model for controlling a dynamic mechanical system, may execute more efficiently on the reduced dimensionality vectors within a latent embedding space. The reduced dimensionality vectors may be embedded within the latent embedding space and may be indicative of state (e.g., of a system, environment, etc.). For example, the latent embedding space may comprise vectors, or regions (e.g., defined based on clusters of vectors), within the latent embedding space, and those vectors or regions may correspond to target states (or anomalous states), and those vectors or regions may occur along a temporal sequence of vectors or regions within the embedding space. A vector output by the machine learning model 302 may be compared to other vectors or region boundaries within the latent embedding space, such as to determine a nearest vector or region within which the output vector occurs. The nearest vector or the region may correspond to a location along a temporal sequence (or in some cases a location where two or more temporal sequences intersect). A next location, like a target location, along a temporal sequence (which may be selected based on task, such as where two or more intersect, based on training on labeled data indicative of task) may be selected as a target state for the robot system. Similarity/dissimilarity (e.g., of inputs) may be determined, based on the properties characterized by reduced dimensionality vectors, e.g., with different images depicting a similar state producing vectors that are close to one another in the latent embedding space, such as based on pairwise distances between vectors that encode relative dissimilarity between the states depicted by corresponding images.

Latent space embeddings within the latent embedding space may be classified in connection with a reinforcement learning process. For example, training of a machine learning model 302 may include the generation of a plurality of latent space embeddings as, or in connection with, outputs 306 of the model which may be classified (e.g., during one or more trial and error processes). The different latent space embeddings and their classification may correspond to states, like those in a Markov decision process. Different ones of the models discussed herein may determine or perform actions based on current, predicted, and known latent space embeddings, such as to take an action determined to maximize reward (e.g., which may be immediate or over time) by transition to a next (e.g., desired, or at least not an undesired or anomalous) state in accordance with sensor feedback corresponding to the robot and its environment. The model may attempt to learn a policy, which in some cases may include a mapping of latent space embeddings based on obtained feedback data to actions performed (e.g., how model outputs caused the robot to transition from one state to another), by which the model may determine an output predicted to transition to a next state that maximizes a reward (which in some cases may be sum of rewards).

Some embodiments may reduce dimensionality of high-dimensional data (e.g., with one million or more dimensions) before it is provided to a reinforcement learning model, such as by forming latent space embedding vectors (e.g., with 100,000 or fewer dimensions) based on high dimension data as described in various embodiments herein to reduce processing complexity to a degree that supports near real-time (e.g., multiple times per second, such as 10, 20 or 30 or more) sequences of state determination to control model outputs that control robot actuators. In some embodiments, the high-dimensional data may be reduced by one or more encoder models (which each may implement a neural network) that process sensor data. In some cases, features may be extracted from sensor data (e.g., with a convolutional neural network or vision transformer for 2D image data, a transformer model or long-short term memory model for time-series data like motor current, or a geometric deep learning model for 3D point clouds from depth sensors). The extracted features may be input to an encoder model, like a time contrastive network or convolution neural network, which may output a vector as a latent space embedding. Or in some embodiments, high-dimensional data such as images from a camera or the raw sensor stream from the robot may be directly processed with deep reinforcement learning algorithms that represent learned actions or functions or policy objectives as a neural network.

In some embodiments, a machine learning model 302 implements deep reinforcement learning via one or more neural networks, one or more of which may be a recurrent neural network. Reinforcement learning is often modeled for low dimensionality data via a Markov decision process where a policy, like a mapping of states and actions that maximizes rewards, is determined through sampling. Many example use cases for reinforcement learning, however, such as those described herein, involve a data stream with high dimensionality. For example, if a robot has multiple color 1080p cameras, multiple touch sensing arrays (e.g., 10 or more), multiple strain sensors (e.g., 20 or 100 or more, such as for a plurality of linkages), a data stream by which state is inferred may include millions, tens of millions, or even more than 100 million dimensions. In some examples, a neural network, which may implement an encoder, may reduce dimensionality of the state space (e.g., to a latent state space). For example, an encoder may determine a vector based on high dimensionality sensor data which can then be embedded in a latent embedding space having reduced dimensionality, such as a space having between 10 and 2000 dimensions in some embodiments (e.g., instead of tens or hundreds of thousands or a million or more dimensions).

In some embodiments, contrastive learning approaches are implemented to minimize distance (e.g., maximize closeness) of similar features within the latent space. In some cases, contrastive learning approaches may maximize distance (e.g., minimize closeness) of dissimilar features within the latent space. In some examples, an objective function may be configured to favor resulting embedding vectors that place dissimilar inputs far apart and similar inputs close together in the latent space. For example, an objective function based on similarity between, for instance, pairs of images, triplets of images, or tuples of larger sets images within a training set, may be used to train a model to output embedding vectors of similar images that are near to each other (e.g., in a region) within the latent embedding space. The same, or a different objective function, may train the model to output embedding vectors of dissimilar images outside of the region, like within another region or at least a threshold distance away from the region, within the latent embedding space. The model may be trained by iteratively adjusting model parameters, like weights and biases of perceptrons, to locally optimize an objective function on a training set. Parameters may be adjusted in directions that, according to partial derivatives of the parameters with respect to the objective function, locally optimize the objective function, e.g., increase fitness of a fitness function or decrease loss of a loss function when the current instantiation of the model is applied to the training set. Model parameters may be iteratively adjusted in this manner until a stopping condition is detected, e.g., more than threshold number of iterations have occurred, or less than a threshold amount of change in an objective function occurs between iterations, indicating a local minimum or maximum. In some cases, different distance metrics may be learned for different portions of the distribution of possible inputs.

In some embodiments, a machine learning model 302 may be structured as a factorization machine model. A machine learning model 302 may be a non-linear model or supervised learning model that can perform classification or regression. For example, the machine learning model 302 may be a general-purpose supervised learning algorithm that a system uses for both classification and regression tasks. Alternatively, the machine learning model 302 may include a Bayesian model configured to perform variational inference (e.g., deviation from a trajectory). A machine learning model 302 may be implemented as a decision tree or as an ensemble model (e.g., using random forest, bagging, adaptive booster, gradient boost, XGBoost, etc.).

Examples of machine learning models may include multiple models. For example, a clustering model may cluster latent space embeddings represented in training (or output) data. In some cases, classification of latent space embeddings within a cluster may indicate information about the state. For example, a clustering model (e.g., K-means, DBSCAN (density-based spatial clustering of applications with noise), or a variety of other unsupervised machine learning models used for clustering) may take as input a latent space embedding and determine whether it belongs (e.g., based on a threshold distance) to one or more other clusters of other space embeddings that have been previously trained. In some cases, nearest clusters may also be identified, such as for determining how close the input latent space embedding is to reaching a cluster (e.g., which may correspond to a desired state of the robot based on classification of the cluster). Classifications associated with the latent space embeddings within a cluster may be indicative of a classification for the cluster, to which the input latent space embedding may be determined to belong, such as to indicate information about state associated with the input latent space embedding. Thus, latent space embeddings in at least some of the respective clusters may include latent space embeddings corresponding to states to complete a task that an instance of the robot has been trained to complete. Some other regions of the latent space may be indicated as anomalous (or unknown), in some cases may include latent space embeddings classified as anomalous (or clusters thereof), or otherwise indicate whether an input latent space embedding corresponds to an undesired state. In traditional approaches, operations like those above may be applied to each instance of a robot, or instance of a model of a robot, and may be re-applied (in many cases from a clean slate as in the case of a new robot instance) when parts or functionality of an instance of a robot are altered or replaced.

Figure 4:
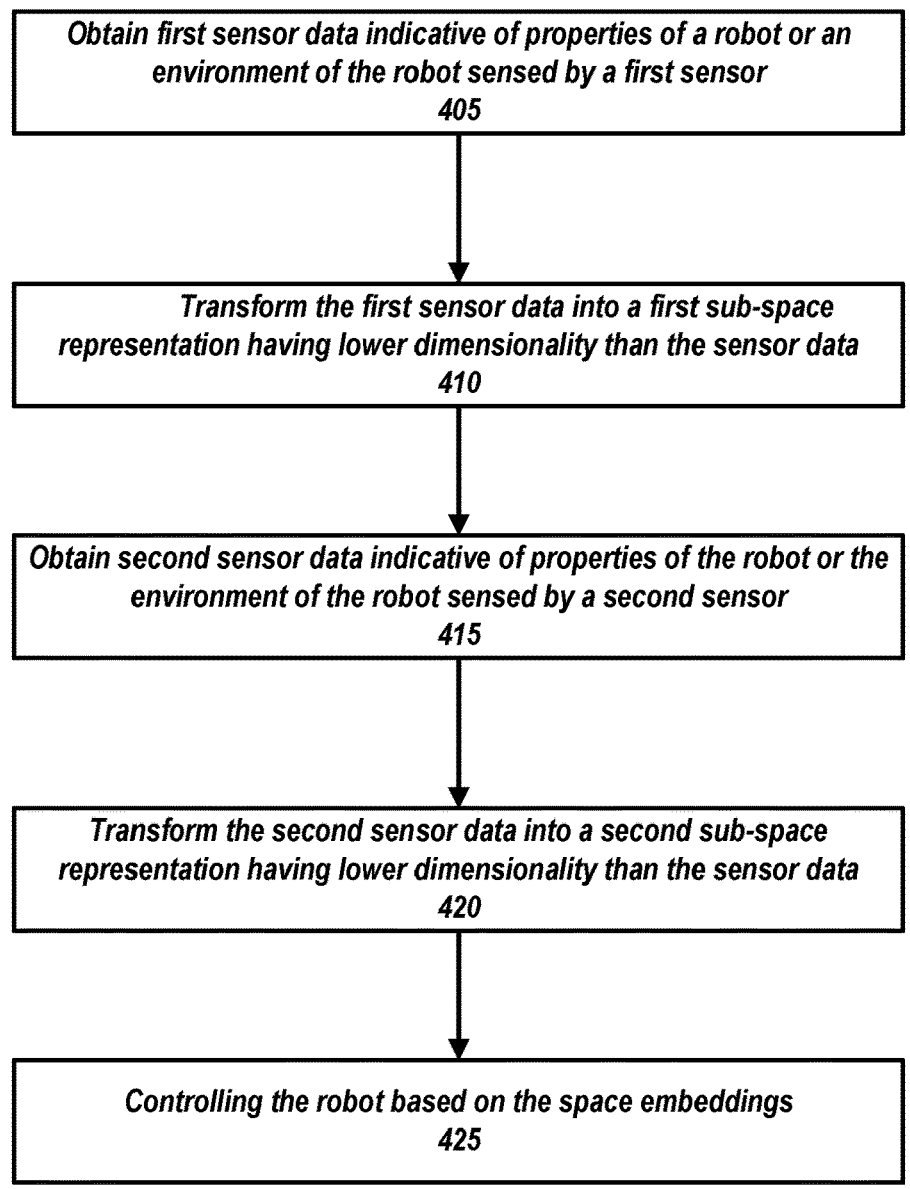
FIG. 4 is a flowchart of an example process for controlling a robot with a hybrid computing architecture, in some example embodiments, in accordance with some example embodiments.

FIG. 4 is a flowchart of an example process 400 for controlling a robot with a hybrid computing architecture, in some example embodiments. In some examples, the models may have inputs or outputs structured in accordance with a given schema. For example, a plurality of encoder models may receive a set of inputs (e.g., sensor data) in a first schema and output a set of results (e.g., for a vector with reduced dimensionality for embedding within a latent embedding space) in a second schema. Other examples of models may include a given type of model to perform other similar types of tasks, such as process natural language text, images, or other input data set, to output a respective result (e.g., classification, localization, detection or recognition of an object, etc.).

In some examples, the process 400 may include obtaining one or more outputs of one or more sensors configured to sense properties indicative of state of a first robot or an environment of a robot. For example, a robot system may be equipped with cameras, position sensors, electromagnetic sensors, proximity sensors, etc. that produce outputs in the form of position data, proximity data, vision data, etc. The one or more outputs may represent sensor data at a single time slice or sensor data taken either periodically or non-periodically over an interval of time. The one or more outputs of the one or more sensors may be a data structure, whether a vector or matrix of values, with a high number of dimensions (e.g., a hundred thousand, a million, one hundred million, etc.). An encoder model of the robot may be trained to the process sensor output data indicative of sensed properties of the state of the robot or the environment of the robot to output a reduced dimensionality vector indicative of the processed sensor data. For example, the reduced dimensionality vectors may preserve relative distance between similar inputs and dissimilar inputs. Various encoder models may be implemented by hardware machine-learning accelerators that may decrease latency (or increase resolution) for determining an output vector within an embedding space (or sub-space) based on sensor output.

In some examples, one or more encoders of a robot may be implemented with a hardware-machine learning accelerator to transform sensor output from one or more sensors (or output of one or more upstream encoders) into a latent space representation. In some examples, the accelerator may be coupled to one or more sensors via a high-performance (e.g., high-speed) bus. In various examples, an accelerator may be co-located on a dynamic system, like a robot, in relative proximity to a sensor that outputs data to the accelerator. For example, a communication signal path between a machine learning accelerator and a sensor coupled via a high-performance bus may be less than 20 cm, less than 10 cm, less than 5 cm, and in some cases, may be co-located on a same PCB. In some examples, a ML Accelerator may execute a model based on the type of sensor (or sensors). Thus, for example, outputs of the one or more sensors may be coupled to different types of encoder models based on the sensor type, and one or more of the encoder models (which may be of different types, or other models by which sensor outputs may be processed) may be implemented by one or more different types of ML Accelerators. In some cases, performance of model-accelerator and model-input data pairings are determined (e.g., based on latency between input/output, accuracy vs latency, etc.), such as to select which types of models to implement on which types of ML Accelerators for which types of input data sets obtained from one or more sensors, one or more other encoders, or a combination thereof.

In a step 405, the process may include obtaining first sensor data indicative of first properties of a robot or an environment of the robot sensed by a first sensor. For example, the first sensor data may be obtained from an output of the first sensor by a first hardware machine-learning accelerator.

In a step 410, the process may include transforming the first sensor data into a first sub-space representation having lower dimensionality than the first sensor data. For example, the first hardware machine-learning accelerator may transform the sensor data into a latent-space representation. This latent-space representation may be referred to as a sub-space representation as it only captures a portion (e.g., a first portion) of the properties sensed by the sensor layer upon which robot state may depend. In some examples, the first accelerator may obtain first sensor data from a first subset of sensors, like two or more sensors of the robot. Thus, for example, the first accelerator may transform inputs received via outputs of the first subset of sensors into a first sub-space representation that accounts for properties sensed by the first subset of sensors of the robot.

In a step 415, the process may include obtaining second sensor data indicative of second properties of the robot or the environment of the robot sensed by a second sensor. For example, the second sensor data may be obtained from an output of the second sensor by a second hardware machine-learning accelerator.

In a step 420, the process may include transforming the second sensor data into a second sub-space representation having lower dimensionality than the second sensor data. For example, the second hardware machine-learning accelerator may transform the sensor data into a latent-space representation. This latent-space representation may be referred to as a sub-space representation as it only captures a portion (e.g., second portion) of the properties sensed by the sensor layer upon which robot state may depend. In some examples, the second accelerator may obtain second sensor data from a second subset of sensors, like two or more sensors of the robot. Thus, for example, the second accelerator may transform inputs received via outputs of the second subset of sensors into a second sub-space representation that accounts for properties sensed by the second subset of sensors of the robot.

In a step 425, the process may include controlling the robot based on the space embeddings. In some examples, a processor may use the combination of sub-space embeddings to control the robot. For example, each sub-space embedding may be indicative of state of a portion of a sensor suite of a robot, and a Markov decision process may determine instructions for controlling respective portions of the robot.

In some examples, a processor, which may be a general purpose processor or a third hardware machine-learning accelerator, may transform a first input corresponding to a first latent space and a second input corresponding a second latent space into third latent space representation that encodes input properties represented in the first input and second input. In other words, the process may transform a first sub-space representation that encodes first properties and a second sub-space representation that encodes second properties into a latent-space representation indicative of a state of the robot or the environment of the robot based on both the first properties and the second properties. Thus, for example, the process may transform a set of inputs, like a first vector corresponding to the first sub-space and a second vector corresponding to the second sub-space, into a representation within a latent embedding space. The process may output the representation, like a vector, that encodes properties corresponding to both (or more) input vectors within the latent embedding space. Accordingly, the output embedding vector may be representative of a single state based on the combination of inputs.

In some examples, step 425 may include transforming, with a processor, the first sub-space representation and the second sub-space representation into a latent-space representation indicative of a state of the robot or the environment of the robot based on both the first properties and the second properties. In turn, a processor may control the robot based on the state of the robot or the environment of the robot as determined by the transformation of two or more sub-space representations into a final latent-space representation.

In some examples, the process may control the robot via one or more control models executed by one or more processor based on the latent-space representation. For example, a robot control model may include a reinforcement learning model trained at least in part via a reinforcement learning process, and the reinforcement learning model may take, as input, outputs of one or more encoder models. The encoder models executed by one or more ML Accelerators may simplify the input parameter space of the reinforcement learning model, which, due to complexity may be executed on a general purposed central processing unit. Reduction of the number of input parameters, for example, may reduce latency of model execution over a stream of input data.

In some examples, a third hardware machine-learning accelerator of the robot, or a second robot, may be initialed based on parameters associated with the first or second accelerator. For example, each of the first and second accelerators may be configured with parameters learned through training that maintain relative distances between inputs and encoded outputs. The model or parameters of an accelerator may be stored in association with information about the sensor data which the accelerator processes. Embodiments may select parameters associated with an accelerator or model executed by an accelerator for the third accelerator based on the third accelerator being coupled to a sensor of the type (e.g., that is expected to produce similar output) to reduce teach time for the third accelerator to learn an embedding space for inputs.

In some examples, the process may include a hierarchy of machine learning accelerators, such as with one or more layers of intermediate machine learning accelerators, in addition to an upstream machine learning accelerator layer comprising accelerators coupled to sensors outputs. Accelerators within the intermediate layer may receive input from outputs of other upstream accelerators (e.g., instead of sensor outputs), like two or more such accelerators. In many examples, an intermediate accelerator may reduce dimensionality of the inputs, such as by 1.2-2 times or more, thus further reducing the dimensionality of data indicative of state of the robot or its environment. For example, a first sensor may provide sensor data of 10,000 dimensions to a first machine-learning accelerator and a second sensor may provide sensor data of 100,000 dimensions to a second machine-learning accelerator. These inputs, respectively, may be reduced by 10 times or more. In turn, an intermediate encoder may receive a first input having 1000 dimensions and a second input having 10000 dimensions. Output of the intermediate encoder may be reduced in dimensionally to 10000 dimension or less (e.g., less than the dimensionality of the input dimensions in combination). In other words, the latent space representation output by the intermediate encoder, like a vectors, may have 10000 dimensions or less that encodes information about sensor properties reported by both upstream encoders. In some examples, the process may provide intermediate encoder output to a reinforcement learning model, which may take as input one or more latent-space embeddings, such as for each time slice of a feedback loop. The reinforcement learning model may be configured to update setpoints for robot actuators based on those vectors (e.g., based on their latent space embedding), such as based on distance between a vector embedding indicative of current state and an embedding corresponding to a next state learned through training as corresponding to a state in a sequence of states that transition state of the robot towards completion of a task.

In some embodiments, robots implementing the present techniques may be trained and controlled with models like those described in a U.S. Pat. App. titled SPATIO-TEMPORAL CONSISTENCY EMBEDDINGS FROM MULTIPLE OBSERVED MODALITIES, bearing Ser. No. 17/657,723, filed by the same applicant as this patent filing, on the same day as this patent filing.

In some embodiments, robots implementing the present techniques may be administered with systems like those described in a U.S. Pat. App. titled SYSTEM FOR PRESENTING ROBOTIC DATA FLOWS FOR APPLICATION DEVELOPMENT, bearing Ser. No. 17/711,973, filed by the same applicant as this patent filing, on the same day as this patent filing.

In some embodiments, robots implementing the present techniques may have touch sensors like those described in a U.S. Pat. App. titled COMBINED ANALOG AND DIGITAL ARCHITECTURE FOR HANDLING SENSORY INPUT DATA, bearing Ser. No. 17/711,983, filed by the same applicant as this patent filing, on the same day as this patent filing.

In some embodiments, fleets of robots implementing the present techniques may managed with systems like those described in a U.S. Pat. App. titled CONFIGURING AND MANAGING FLEETS OF DYNAMIC MECHANICAL SYSTEMS, bearing Ser. No. 17/711,991, filed by the same applicant as this patent filing, on the same day as this patent filing.

In some embodiments, fleets of robots implementing the present techniques may managed with systems like those described in a U.S. Pat. App. titled SCHEDULER FOR ROBOT FLEETS, bearing Ser. No. 17/711,997, filed by the same applicant as this patent filing, on the same day as this patent filing.

Figure 5:
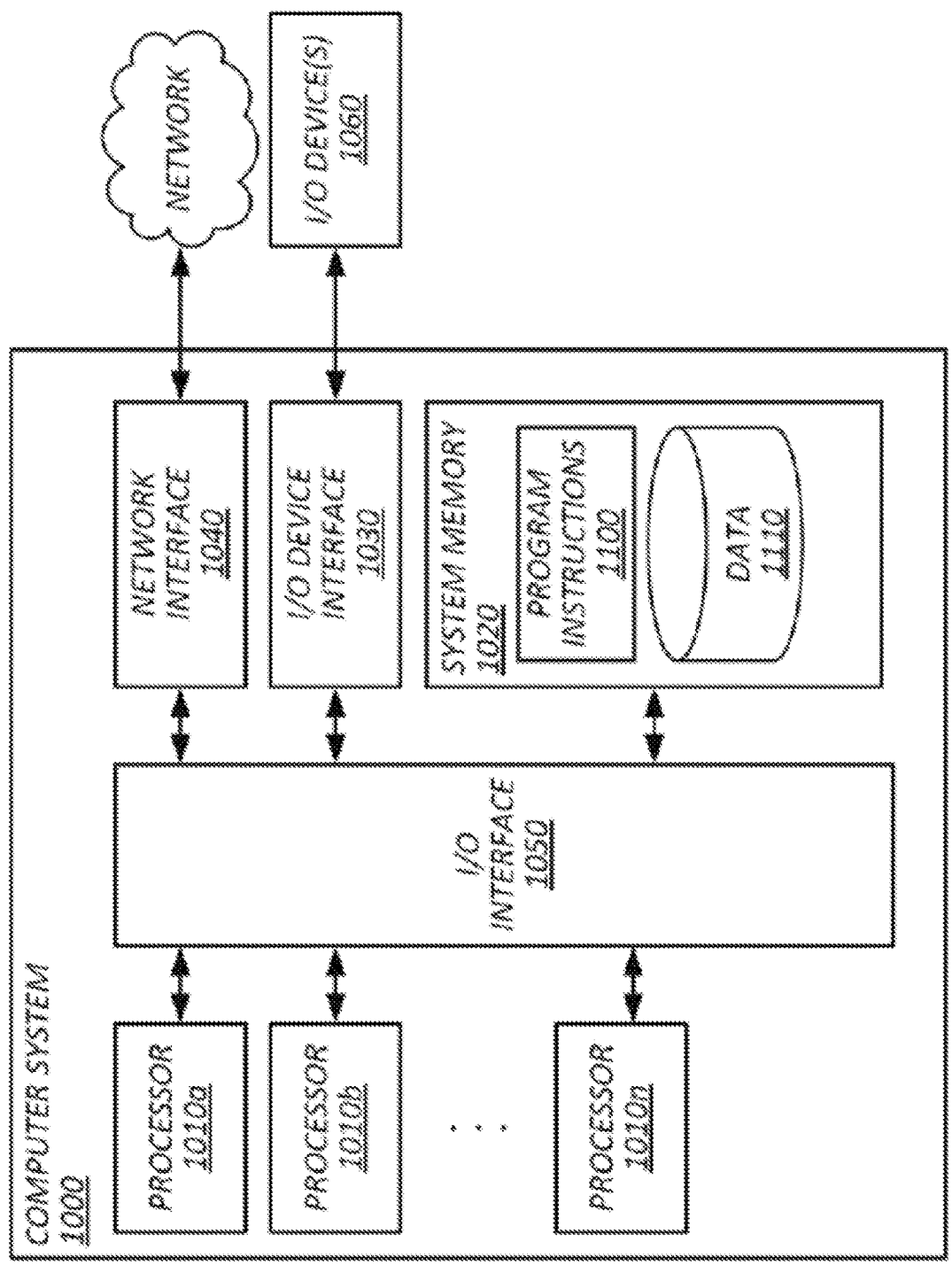
FIG. 5 is a physical architecture block diagram that shows an example of a computing device (or data processing system) by which some aspects of the above techniques may be implemented, in accordance with some example embodiments.

FIG. 5 is a physical architecture block diagram that shows an example of a computing device (or data processing system) by which some aspects of the above techniques may be implemented. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) can be said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description is not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood when considered in view of the following enumerated embodiments:

1. An embodiment of a system, comprising: a plurality of sensors, each sensor configured to output sensor data about system state or environment state on a high-speed bus; a set of upstream hardware machine-learning accelerators, each upstream accelerator configured to obtain sensor data from at least one sensor on a high-speed bus and transform the sensor data into output vectors indicative of the sensor data, the output vectors corresponding to a subspace having reduced dimensionality relative to a sensor data space of the at least one sensor; a downstream encoder, the downstream encoder configured to obtain vectors from at least two upstream accelerators and transform the vectors into output embedding vectors within an embedding space representative of system and environment state reported by the plurality of sensors; and a processor configured to execute a reinforcement learning control model for controlling the system based on the embedding vectors representative of system and environment state.
2. The system of embodiment 1, further comprising: a set of intermediate hardware machine-learning accelerators, each intermediate accelerator configured to obtain vectors from at least two upstream accelerators on a high-speed bus and transform the vectors into output intermediate vectors indicative of a subset of the sensor data, the intermediate vectors corresponding to a second subspace having reduced dimensionality relative to the first subspaces in combination, wherein: the downstream encoder obtains intermediate vectors from at least two of the intermediate accelerators, and the downstream encoder transforms the intermediate vectors into the output embedding vectors within the embedding space representative of system and environment state reported by the plurality of sensors.
3. The system of embodiment 2, wherein the downstream encoder is a downstream hardware machine-learning accelerator.
4. The system of embodiment 1, wherein: at least some sensor data outputs are coupled directly to upstream accelerator inputs via a high-speed bus.
5. The system of embodiment 1, wherein: one or more of the upstream hardware machine-learning accelerators comprise one or more special-purpose processing chips that accelerate encoding of a respective type of ingested sensor data with dimensionality reduction of at least two orders of magnitude; and the processor configured to execute a reinforcement learning control model is a general-purpose processor.
6. An embodiment of a robot system, comprising: a first sensor configured to sense first properties of a robot or an environment of the robot and output first sensor data indicative of the sensed properties; a first hardware machine-learning accelerator coupled to an output of the first sensor, the first accelerator being configured to transform the first sensor data into a first sub-space representation having lower dimensionality than the first sensor data; a second sensor configured to sense second properties of the robot or the environment of the robot and output second sensor data indicative of the sensed properties; a second hardware machine-learning accelerator coupled to an output of the second sensor, the second accelerator being configured to transform the first sensor data into a second sub-space representation having lower dimensionality than the second sensor data; and a processor configured to receive, as input, the first sub-space representation and the second sub-space representation and transform the first sub-space representation and the second sub-space representation into a latent-space representation indicative of a state of the robot or the environment of the robot based on both the first properties and the second properties.
7. The robot system of embodiment 6, wherein: the first sensor and the first accelerator are directly coupled via a first high-speed bus connection, and the second sensor and the second accelerator are directly coupled via a second high-speed bus connection.
8. The robot system of embodiment 7, wherein: the first high-speed bus connection and the second high-speed bus connection are each less than 10 cm in length.
9. An embodiment of a hybrid computing architecture of a robot system, comprising: a sensor layer comprising a plurality of sensors configured to sense properties corresponding to a state of a robot or an environment of the robot and output data indicative of the sensed properties; a hardware machine-learning accelerator layer comprising two or more hardware machine-learning accelerators disposed at different locations on the robot proximate to one or more respectively co-located sensors, wherein: an accelerator is coupled to an output of at least one co-located sensor, and configured to determine, based on the output data of the one or more sensors, a reduced dimensionality vector representation of the output data within an embedding space; and a general processor configured to execute a control model of the robot, wherein: the control model is trained at least in part on labeled vectors within one or more embedding spaces; and the control model causes the processor to issue instructions to one or more actuators of the robot based on distances between vectors indicative of current state of the robot and embeddings corresponding to target states within the one or more embedding spaces.
10. The system of embodiment 9, wherein a sensor and an accelerator having a data communication path of less than 20 cm are co-located.
11. The system of embodiment 10, wherein at least one sensor and an accelerator have a data communication path of less than 10 cm.
12. The system of embodiment 11, wherein a second sensor and an accelerator have a data communication path of less than 5 cm.
13. The system of embodiment 12, wherein a third sensor and an accelerator have a data communication path of less than 5 cm on a same printed circuit board.
14. The system of embodiment 9, wherein: the sensor layer comprises at least 4 different types of sensors and at least 8 sensors. the hardware machine-learning accelerator layer comprises at least 4 different accelerators.
15. The system of embodiment 9, further comprising: an intermediate hardware-machine learning accelerator layer comprising one or more intermediate hardware machine-learning accelerators coupled to outputs of accelerators of an upstream hardware machine-learning accelerator layer comprising the two or more hardware machine-learning accelerators disposed at different locations on the robot proximate to one or more respectively co-located sensors.
16. An embodiment of a method, comprising: obtaining, with a first hardware machine-learning accelerator, output comprising first sensor data indicative of first properties of a robot or an environment of the robot sensed by a first sensor; transforming, with the first machine-learning accelerator, the first sensor data into a first sub-space representation having lower dimensionality than the first sensor data; obtaining, with a second hardware machine-learning accelerator, output comprising second sensor data indicative of second properties of the robot or the environment of the robot sensed by a second sensor; transforming, with the second machine-learning accelerator, the second sensor data into a second sub-space representation having lower dimensionality than the second sensor data; transforming, with a processor, the first sub-space representation and the second sub-space representation into a latent-space representation indicative of a state of the robot or the environment of the robot based on both the first properties and the second properties; and controlling the robot based state of the robot or the environment of the robot.

17. The method of embodiment 16, wherein: the first sensor data comprises first properties of the robot or the environment sensed by a first subset of sensors comprising two or more sensors, and transforming, with the first machine-learning accelerator, the first sensor data into a first sub-space representation having lower dimensionality than the first sensor data comprises transforming output from each of the sensors in the first subset.

18. The method of embodiment 17, wherein: the second sensor data comprises second properties of the robot or the environment sensed by a second subset of sensors comprising two or more sensors, transforming, with the second machine-learning accelerator, the second sensor data into a second sub-space representation having lower dimensionality than the second sensor data comprises transforming output from each of the sensors in the second subset, and transforming the first sub-space representation and the second sub-space representation into the latent-space representation comprises training an encoder model executed by the processor to output a vector indicative of the state of the robot or the environment of the robot based on training records comprising outputs of the first machine-learning accelerator and the second machine-learning accelerator.

19. The method of embodiment 16, wherein: transforming the first sub-space representation and the second sub-space representation into the latent-space representation comprises training an encoder model executed by the processor to output a vector indicative of the state of the robot or the environment of the robot based on training records comprising outputs of the first machine-learning accelerator and the second machine-learning accelerator.

20. The method of embodiment 16, wherein: the processor is a third hardware-machine learning accelerator, and a general purpose processor executes one or more control models to control the robot.

What is claimed is:

1. A system, comprising:
a plurality of sensors, each sensor configured to output sensor data about system state or environment state on a high-speed bus;
a set of upstream hardware machine-learning accelerators, each upstream accelerator configured to obtain sensor data from at least one sensor on a high-speed bus and transform the sensor data into output vectors indicative of the sensor data, the output vectors corresponding to a subspace having reduced dimensionality relative to a sensor data space of the at least one sensor;
a downstream encoder, the downstream encoder configured to obtain vectors from at least two upstream accelerators and transform the vectors into output embedding vectors within an embedding space representative of system and environment state reported by the plurality of sensors; and
a processor configured to execute a reinforcement learning control model for controlling the system based on the embedding vectors representative of system and environment state.

2. The system of claim 1, further comprising:
a set of intermediate hardware machine-learning accelerators, each intermediate accelerator configured to obtain vectors from at least two upstream accelerators on a high-speed bus and transform the vectors into output intermediate vectors indicative of a subset of the sensor data, the intermediate vectors corresponding to a second subspace having reduced dimensionality relative to the first subspaces in combination, wherein:
the downstream encoder obtains intermediate vectors from at least two of the intermediate accelerators, and
the downstream encoder transforms the intermediate vectors into the output embedding vectors within the embedding space representative of system and environment state reported by the plurality of sensors.

3. The system of claim 2, wherein the downstream encoder is a downstream hardware machine-learning accelerator.

4. The system of claim 1, wherein:
at least some sensor data outputs are coupled directly to upstream accelerator inputs via a high-speed bus.

5. The system of claim 1, wherein:
one or more of the upstream hardware machine-learning accelerators comprise one or more special-purpose processing chips that accelerate encoding of a respective type of ingested sensor data with dimensionality reduction of at least two orders of magnitude; and
the processor configured to execute a reinforcement learning control model is a general-purpose processor.

6. A robot system, comprising:
a first sensor configured to sense first properties of a robot or an environment of the robot and output first sensor data indicative of the sensed properties;
a first hardware machine-learning accelerator coupled to an output of the first sensor, the first accelerator being configured to transform the first sensor data into a first sub-space representation having lower dimensionality than the first sensor data;
a second sensor configured to sense second properties of the robot or the environment of the robot and output second sensor data indicative of the sensed properties;
a second hardware machine-learning accelerator coupled to an output of the second sensor, the second accelerator being configured to transform the first sensor data into a second sub-space representation having lower dimensionality than the second sensor data; and
a processor configured to receive, as input, the first sub-space representation and the second sub-space representation and transform the first sub-space representation and the second sub-space representation into a latent-space representation indicative of a state of the robot or the environment of the robot based on both the first properties and the second properties.

7. The robot system of claim 6, wherein:
the first sensor and the first accelerator are directly coupled via a first high-speed bus connection, and
the second sensor and the second accelerator are directly coupled via a second high-speed bus connection.

8. The robot system of claim 7, wherein:
the first high-speed bus connection and the second high-speed bus connection are each less than 10 cm in length.

9. A hybrid computing architecture of a robot system, comprising:
a sensor layer comprising a plurality of sensors configured to sense properties corresponding to a state of a robot or an environment of the robot and output data indicative of the sensed properties;

a hardware machine-learning accelerator layer comprising two or more hardware machine-learning accelerators disposed at different locations on the robot proximate to one or more respectively co-located sensors, wherein:

an accelerator is coupled to an output of at least one co-located sensor, and configured to determine, based on the output data of the one or more sensors, a reduced dimensionality vector representation of the output data within an embedding space; and a general processor configured to execute a control model of the robot, wherein:

the control model is trained at least in part on labeled vectors within one or more embedding spaces; and the control model causes the processor to issue instructions to one or more actuators of the robot based distances between vectors indicative of current state of the robot and embeddings corresponding to target states within the one or more embedding spaces.

10. The system of claim 9, wherein a sensor and an accelerator having a data communication path of less than 20 cm are co-located.

11. The system of claim 10, wherein at least one sensor and an accelerator have a data communication path of less than 10 cm.

12. The system of claim 11, wherein a second sensor and an accelerator have a data communication path of less than 5 cm.

13. The system of claim 12, wherein a third sensor and an accelerator have a data communication path of less than 5 cm on a same printed circuit board.

14. The system of claim 9, wherein:

the sensor layer comprises at least 4 different types of sensors and at least 8 sensors, the hardware machine-learning accelerator layer comprises at least 4 different accelerators.

15. The system of claim 9, further comprising:

an intermediate hardware-machine learning accelerator layer comprising one or more intermediate hardware machine-learning accelerators coupled to outputs of accelerators of an upstream hardware machine-learning accelerator layer comprising the two or more hardware machine-learning accelerators disposed at different locations on the robot proximate to one or more respectively co-located sensors.

16. A method, comprising:

obtaining, with a first hardware machine-learning accelerator, output comprising first sensor data indicative of first properties of a robot or an environment of the robot sensed by a first sensor;

transforming, with the first machine-learning accelerator, the first sensor data into a first sub-space representation having lower dimensionality than the first sensor data;

obtaining, with a second hardware machine-learning accelerator, output comprising second sensor data indicative of second properties of the robot or the environment of the robot sensed by a second sensor;

transforming, with the second machine-learning accelerator, the second sensor data into a second sub-space representation having lower dimensionality than the second sensor data;

transforming, with a processor, the first sub-space representation and the second sub-space representation into a latent-space representation indicative of a state of the robot or the environment of the robot based on both the first properties and the second properties; and controlling the robot based state of the robot or the environment of the robot.

17. The method of claim 16, wherein:

the first sensor data comprises first properties of the robot or the environment sensed by a first subset of sensors comprising two or more sensors, and transforming, with the first machine-learning accelerator, the first sensor data into a first sub-space representation having lower dimensionality than the first sensor data comprises transforming output from each of the sensors in the first subset.

18. The method of claim 17, wherein:

the second sensor data comprises second properties of the robot or the environment sensed by a second subset of sensors comprising two or more sensors, transforming, with the second machine-learning accelerator, the second sensor data into a second sub-space representation having lower dimensionality than the second sensor data comprises transforming output from each of the sensors in the second subset, and transforming the first sub-space representation and the second sub-space representation into the latent-space representation comprises training an encoder model executed by the processor to output a vector indicative of the state of the robot or the environment of the robot based on training records comprising outputs of the first machine-learning accelerator and the second machine-learning accelerator.

19. The method of claim 16, wherein:

transforming the first sub-space representation and the second sub-space representation into the latent-space representation comprises training an encoder model executed by the processor to output a vector indicative of the state of the robot or the environment of the robot based on training records comprising outputs of the first machine-learning accelerator and the second machine-learning accelerator.

20. The method of claim 16, wherein:

the processor is a third hardware-machine learning accelerator, and a general purpose processor executes one or more control models to control the robot.

* * * * *